United States Patent
Proctor, Jr. et al.

(10) Patent No.: US 7,990,904 B2
(45) Date of Patent: Aug. 2, 2011

(54) WIRELESS NETWORK REPEATER

(75) Inventors: James A. Proctor, Jr., Melbourne Beach, FL (US); Kenneth M. Gainey, Satellite Beach, FL (US)

(73) Assignee: QUALCOMM Incorporated, San Diego, CA (US)

( * ) Notice: Subject to any disclaimer, the term of this patent is extended or adjusted under 35 U.S.C. 154(b) by 1154 days.

(21) Appl. No.: 10/536,471

(22) PCT Filed: Dec. 16, 2003

(86) PCT No.: PCT/US03/39889
§ 371 (c)(1),
(2), (4) Date: May 26, 2005

(87) PCT Pub. No.: WO2004/062305
PCT Pub. Date: Jul. 22, 2004

(65) Prior Publication Data
US 2006/0098592 A1 May 11, 2006

Related U.S. Application Data

(60) Provisional application No. 60/433,171, filed on Dec. 16, 2002.

(51) Int. Cl.
*H04J 3/08* (2006.01)
(52) U.S. Cl. .................................. 370/315; 370/338
(58) Field of Classification Search .................. None
See application file for complete search history.

(56) References Cited

U.S. PATENT DOCUMENTS

| | | | |
|---|---|---|---|
| 3,363,250 A | 1/1968 | Irving | |
| 4,000,467 A | 12/1976 | Lentz et al. | |
| 4,001,691 A | 1/1977 | Gruenberg | |
| 4,061,970 A | 12/1977 | Magneron et al. | |
| 4,081,752 A | 3/1978 | Sumi | |
| 4,124,825 A | 11/1978 | Webb et al. | |
| 4,204,016 A | 5/1980 | Chavannes | |
| 4,334,323 A | 6/1982 | Moore | |
| 4,368,541 A | 1/1983 | Evans | |

(Continued)

FOREIGN PATENT DOCUMENTS

CN 1186401 7/1998

(Continued)

OTHER PUBLICATIONS

Notification of the First Office Action from Chinese Patent Office dated Sep. 8, 2006 for the corresponding Chinese patent application No. 200380105267.7.

(Continued)

*Primary Examiner* — Lester Kincaid
*Assistant Examiner* — Phuoc Doan
(74) *Attorney, Agent, or Firm* — Linda G. Gunderson

(57) ABSTRACT

A frequency translating repeater (250) for use in a time division duplex radio protocol communications system includes a processor (260), a bus (261), a memory (262), an RF section (264), and an integrated station device (264). An access point (210) is detected based on information transmitted frequency channels using a protocol. Detection is initiated automatically during a power-on sequence or by activating an input device such as a button. Frequency channels are scanned for a beacon signal and an access point chosen as a preferred access point based on a metric such as power level.

50 Claims, 6 Drawing Sheets

U.S. PATENT DOCUMENTS

| | | | |
|---|---|---|---|
| 4,509,206 A | 4/1985 | Carpe et al. |
| 4,701,935 A | 10/1987 | Namiki et al. |
| 4,723,302 A | 2/1988 | Fulmer et al. |
| 4,777,653 A | 10/1988 | Bonnerot et al. |
| 4,783,843 A | 11/1988 | Leff et al. |
| 4,820,568 A | 4/1989 | Harpell et al. |
| 4,922,259 A | 5/1990 | Hall et al. |
| 5,023,930 A | 6/1991 | Leslie |
| 5,095,528 A | 3/1992 | Leslie et al. |
| 5,214,788 A | 5/1993 | Delaperriere et al. |
| 5,220,562 A | 6/1993 | Takada et al. |
| 5,280,480 A | 1/1994 | Pitt et al. |
| 5,333,175 A | 7/1994 | Ariyavisitakul et al. |
| 5,341,364 A | 8/1994 | Marra et al. |
| 5,349,463 A | 9/1994 | Hirohashi et al. |
| 5,368,897 A | 11/1994 | Kurihara et al. |
| 5,371,734 A | 12/1994 | Fischer et al. |
| 5,373,503 A | 12/1994 | Chen et al. |
| 5,383,144 A | 1/1995 | Kato |
| 5,408,197 A | 4/1995 | Miyake et al. |
| 5,408,618 A | 4/1995 | Aho et al. |
| 5,430,726 A | 7/1995 | Moorwood et al. |
| 5,446,770 A | 8/1995 | Urabe et al. |
| 5,465,251 A | 11/1995 | Judd et al. |
| 5,471,642 A | 11/1995 | Palmer |
| 5,485,486 A | 1/1996 | Gilhousen et al. |
| 5,509,028 A | 4/1996 | Marque-Pucheu et al. |
| 5,515,376 A | 5/1996 | Murthy et al. |
| 5,519,619 A | 5/1996 | Seda |
| 5,608,755 A | 3/1997 | Rakib et al. |
| 5,610,916 A | 3/1997 | Kostreski et al. |
| 5,648,984 A | 7/1997 | Kroninger et al. |
| 5,654,979 A | 8/1997 | Levin et al. |
| 5,659,879 A | 8/1997 | Dupuy |
| 5,678,177 A | 10/1997 | Beasley |
| 5,678,198 A | 10/1997 | Lemson et al. |
| 5,684,801 A | 11/1997 | Amitay et al. |
| 5,697,052 A | 12/1997 | Treatch |
| 5,726,980 A | 3/1998 | Rickard et al. |
| 5,732,334 A | 3/1998 | Miyake et al. |
| 5,745,846 A | 4/1998 | Myer et al. |
| 5,754,540 A | 5/1998 | Liu et al. |
| 5,764,636 A | 6/1998 | Edsall et al. |
| 5,767,788 A | 6/1998 | Ness |
| 5,771,174 A | 6/1998 | Spinner et al. |
| 5,784,683 A | 7/1998 | Sistanizadeh et al. |
| 5,794,145 A | 8/1998 | Milam |
| 5,812,933 A | 9/1998 | Niki |
| 5,815,795 A | 9/1998 | Iwai |
| 5,825,809 A | 10/1998 | Sim |
| 5,852,629 A | 12/1998 | Iwamatsu et al. |
| 5,857,144 A | 1/1999 | Mangum et al. |
| 5,862,207 A | 1/1999 | Aoshima |
| 5,875,179 A | 2/1999 | Tikalsky |
| 5,883,884 A | 3/1999 | Atkinson |
| 5,884,181 A | 3/1999 | Arnold et al. |
| 5,890,055 A | 3/1999 | Chu et al. |
| 5,903,553 A | 5/1999 | Sakamoto et al. |
| 5,907,794 A | 5/1999 | Lehmusto et al. |
| 5,963,846 A | 10/1999 | Kurby et al. |
| 5,987,304 A | 11/1999 | Latt |
| 6,005,855 A | 12/1999 | Zehavi et al. |
| 6,005,884 A * | 12/1999 | Cook et al. ............ 375/132 |
| 6,014,380 A | 1/2000 | Hendel et al. |
| 6,032,194 A | 2/2000 | Gai et al. |
| 6,061,548 A | 5/2000 | Reudink et al. |
| 6,088,570 A | 7/2000 | Komara et al. |
| 6,101,400 A | 8/2000 | Ogaz et al. |
| 6,108,364 A | 8/2000 | Weaver, Jr. et al. |
| 6,128,512 A | 10/2000 | Trompower et al. |
| 6,128,729 A | 10/2000 | Kimball et al. |
| 6,163,276 A | 12/2000 | Irving et al. |
| 6,188,694 B1 | 2/2001 | Fine et al. |
| 6,188,719 B1 | 2/2001 | Collomby |
| 6,195,051 B1 | 2/2001 | McCoy et al. |
| 6,202,114 B1 | 3/2001 | Dutt et al. |
| 6,215,982 B1 | 4/2001 | Trompower et al. |
| 6,219,739 B1 | 4/2001 | Dutt et al. |
| 6,222,503 B1 | 4/2001 | Gietema et al. |
| 6,272,351 B1 | 8/2001 | Langston et al. |
| 6,285,863 B1 | 9/2001 | Zhang et al. |
| 6,298,061 B1 | 10/2001 | Chin et al. |
| 6,304,563 B1 | 10/2001 | Blessent et al. |
| 6,304,575 B1 | 10/2001 | Carroll et al. |
| 6,331,792 B1 | 12/2001 | Tonietto et al. |
| 6,339,694 B1 | 1/2002 | Komara et al. |
| 6,342,777 B1 | 1/2002 | Takahashi et al. |
| 6,363,068 B1 | 3/2002 | Kinoshita et al. |
| 6,370,185 B1 | 4/2002 | Schmutz et al. |
| 6,370,369 B1 | 4/2002 | Kraiem et al. |
| 6,377,612 B1 | 4/2002 | Baker et al. |
| 6,377,640 B2 | 4/2002 | Trans et al. |
| 6,384,765 B1 | 5/2002 | Sjostrand et al. |
| 6,385,181 B1 | 5/2002 | Tsutsui et al. |
| 6,388,995 B1 | 5/2002 | Gai et al. |
| 6,393,299 B1 | 5/2002 | Mizumoto et al. |
| 6,404,775 B1 | 6/2002 | Leslie et al. |
| 6,441,781 B1 | 8/2002 | Rog et al. |
| 6,473,131 B1 | 10/2002 | Neugebauer et al. |
| 6,480,481 B1 | 11/2002 | Park et al. |
| 6,501,955 B1 | 12/2002 | Durrant et al. |
| 6,535,732 B1 | 3/2003 | McIntosh et al. |
| 6,539,028 B1 | 3/2003 | Soh et al. |
| 6,539,204 B1 | 3/2003 | Marsh et al. |
| 6,549,542 B1 | 4/2003 | Dong et al. |
| 6,549,567 B1 | 4/2003 | Fullerton et al. |
| 6,563,468 B2 | 5/2003 | Hill et al. |
| 6,574,198 B1 | 6/2003 | Petersson |
| 6,628,624 B1 | 9/2003 | Mahajan et al. |
| 6,664,932 B2 | 12/2003 | Sabet et al. |
| 6,671,502 B1 | 12/2003 | Ogawa et al. |
| 6,684,058 B1 | 1/2004 | Karacaoglu et al. |
| 6,690,657 B1 | 2/2004 | Lau et al. |
| 6,694,125 B2 | 2/2004 | White |
| 6,718,160 B2 | 4/2004 | Schmutz et al. |
| 6,728,541 B2 | 4/2004 | Ohkura |
| 6,766,113 B1 | 7/2004 | Al-Salameh |
| 6,781,544 B2 | 8/2004 | Saliga et al. |
| 6,788,256 B2 | 9/2004 | Hollister |
| 6,880,103 B2 | 4/2005 | Kim et al. |
| 6,904,266 B1 | 6/2005 | Jin et al. |
| 6,906,669 B2 | 6/2005 | Sabet et al. |
| 6,934,511 B1 | 8/2005 | Lovinggood et al. |
| 6,934,555 B2 | 8/2005 | Silva et al. |
| 6,944,139 B1 | 9/2005 | Campanella et al. |
| 6,957,042 B2 | 10/2005 | Williams |
| 6,983,162 B2 | 1/2006 | Garani et al. |
| 6,985,516 B1 | 1/2006 | Easton et al. |
| 6,990,313 B1 | 1/2006 | Yarkosky et al. |
| 7,027,418 B2 | 4/2006 | Gan et al. |
| 7,027,770 B2 | 4/2006 | Judd et al. |
| 7,043,203 B2 | 5/2006 | Miquel et al. |
| 7,050,442 B1 | 5/2006 | Sugar, et al. |
| 7,050,452 B2 | 5/2006 | Sugar et al. |
| 7,058,368 B2 | 6/2006 | Nicholls et al. |
| 7,088,734 B2 | 8/2006 | Newberg et al. |
| 7,103,344 B2 | 9/2006 | Menard et al. |
| 7,120,930 B2 | 10/2006 | Maufer et al. |
| 7,123,670 B2 | 10/2006 | Gilbert et al. |
| 7,123,676 B2 | 10/2006 | Gebara et al. |
| 7,132,988 B2 | 11/2006 | Yegin et al. |
| 7,133,391 B2 | 11/2006 | Belcea |
| 7,133,460 B2 | 11/2006 | Bae et al. |
| 7,139,527 B2 | 11/2006 | Tamaki et al. |
| 7,167,526 B2 | 1/2007 | Liang et al. |
| 7,187,904 B2 | 3/2007 | Gainey et al. |
| 7,193,975 B2 | 3/2007 | Tsutsumi et al. |
| 7,194,275 B2 | 3/2007 | Bolin et al. |
| 7,200,134 B2 | 4/2007 | Proctor, Jr. et al. |
| 7,215,964 B2 | 5/2007 | Miyake et al. |
| 7,230,935 B2 | 6/2007 | Proctor, Jr. et al. |
| 7,233,771 B2 | 6/2007 | Proctor, Jr. et al. |
| 7,248,645 B2 | 7/2007 | Vialle |
| 7,254,132 B2 | 8/2007 | Takao et al. |
| 7,299,005 B1 | 11/2007 | Yarkosky et al. |
| 7,315,573 B2 | 1/2008 | Lusky et al. |
| 7,319,714 B2 | 1/2008 | Sakata et al. |

| | | |
|---|---|---|
| 7,321,787 B2 | 1/2008 | Kim et al. |
| 7,339,926 B2 | 3/2008 | Stanwood et al. |
| 7,352,696 B2 | 4/2008 | Stephens et al. |
| 7,409,186 B2 | 8/2008 | Van Buren et al. |
| 7,430,397 B2 | 9/2008 | Suda et al. |
| 7,450,936 B2 | 11/2008 | Kim |
| 7,457,587 B2 | 11/2008 | Chung |
| 7,486,929 B2 | 2/2009 | Van Buren et al. |
| 7,577,398 B2 | 8/2009 | Judd et al. |
| 7,590,145 B2 | 9/2009 | Futch et al. |
| 7,623,826 B2 | 11/2009 | Pergal et al. |
| 7,676,194 B2 | 3/2010 | Rappaport et al. |
| 7,729,669 B2 | 6/2010 | Van Buren et al. |
| 2001/0031646 A1 | 10/2001 | Williams et al. |
| 2001/0040699 A1 | 11/2001 | Osawa et al. |
| 2001/0050580 A1 | 12/2001 | O'Toole |
| 2001/0050906 A1 | 12/2001 | Odenwalder et al. |
| 2001/0054060 A1 | 12/2001 | Fillebrown et al. |
| 2002/0004924 A1 | 1/2002 | Kim et al. |
| 2002/0018487 A1 | 2/2002 | Chen et al. |
| 2002/0034958 A1 | 3/2002 | Oberschmidt et al. |
| 2002/0045461 A1 | 4/2002 | Bongfeldt et al. |
| 2002/0061031 A1 | 5/2002 | Sugar et al. |
| 2002/0089945 A1 | 7/2002 | Belcea et al. |
| 2002/0101843 A1* | 8/2002 | Sheng et al. .................. 370/338 |
| 2002/0102948 A1 | 8/2002 | Stanwood et al. |
| 2002/0109585 A1 | 8/2002 | Sanderson |
| 2002/0115409 A1 | 8/2002 | Khayrallah et al. |
| 2002/0119783 A1 | 8/2002 | Bourlas et al. |
| 2002/0136268 A1 | 9/2002 | Gan et al. |
| 2002/0141435 A1 | 10/2002 | Newberg et al. |
| 2002/0159506 A1 | 10/2002 | Alamouti et al. |
| 2002/0163902 A1 | 11/2002 | Takao et al. |
| 2002/0177401 A1 | 11/2002 | Judd et al. |
| 2003/0026363 A1 | 2/2003 | Stoter et al. |
| 2003/0139175 A1 | 7/2003 | Kim |
| 2003/0179734 A1 | 9/2003 | Tsutsumi et al. |
| 2003/0185163 A1 | 10/2003 | Bertonis et al. |
| 2003/0211828 A1 | 11/2003 | Dalgleish et al. |
| 2003/0235170 A1* | 12/2003 | Trainin .................. 370/338 |
| 2003/0236069 A1 | 12/2003 | Sakata et al. |
| 2004/0029537 A1 | 2/2004 | Pugel et al. |
| 2004/0038707 A1 | 2/2004 | Kim |
| 2004/0047333 A1 | 3/2004 | Han et al. |
| 2004/0047335 A1 | 3/2004 | Proctor, Jr. et al. |
| 2004/0056802 A1 | 3/2004 | Hollister |
| 2004/0110469 A1 | 6/2004 | Judd et al. |
| 2004/0131025 A1 | 7/2004 | Dohler et al. |
| 2004/0146013 A1 | 7/2004 | Song et al. |
| 2004/0157551 A1 | 8/2004 | Gainey et al. |
| 2004/0166802 A1 | 8/2004 | McKay, Sr. et al. |
| 2004/0176050 A1 | 9/2004 | Steer et al. |
| 2004/0198295 A1 | 10/2004 | Nicholls et al. |
| 2004/0208258 A1 | 10/2004 | Lozano et al. |
| 2004/0218683 A1 | 11/2004 | Batra et al. |
| 2004/0229563 A1 | 11/2004 | Fitton et al. |
| 2004/0235417 A1 | 11/2004 | Dean |
| 2004/0248581 A1 | 12/2004 | Seki et al. |
| 2004/0264511 A1 | 12/2004 | Futch et al. |
| 2005/0014464 A1 | 1/2005 | Larsson et al. |
| 2005/0030891 A1 | 2/2005 | Stephens et al. |
| 2005/0042999 A1 | 2/2005 | Rappaport |
| 2005/0130587 A1 | 6/2005 | Suda et al. |
| 2005/0201315 A1 | 9/2005 | Lakkis |
| 2005/0254442 A1 | 11/2005 | Proctor Jr, et al. |
| 2005/0286448 A1 | 12/2005 | Proctor et al. |
| 2006/0028388 A1 | 2/2006 | Schantz |
| 2006/0035643 A1 | 2/2006 | Vook et al. |
| 2006/0041680 A1 | 2/2006 | Proctor, Jr |
| 2006/0052066 A1 | 3/2006 | Cleveland et al. |
| 2006/0052099 A1 | 3/2006 | Parker et al. |
| 2006/0056352 A1 | 3/2006 | Proctor et al. |
| 2006/0063484 A1 | 3/2006 | Proctor, Jr., et al. |
| 2006/0063485 A1 | 3/2006 | Gainey et al. |
| 2006/0203757 A1 | 9/2006 | Young et al. |
| 2006/0262026 A1 | 11/2006 | Gainey et al. |
| 2007/0025349 A1 | 2/2007 | Bajic et al. |
| 2007/0025486 A1 | 2/2007 | Gainey et al. |
| 2007/0032192 A1 | 2/2007 | Gainey et al. |
| 2007/0121546 A1 | 5/2007 | Zuckerman et al. |
| 2007/0286110 A1 | 12/2007 | Proctor et al. |
| 2008/0057862 A1 | 3/2008 | Smith et al. |
| 2008/0233942 A9 | 9/2008 | Kim et al. |

FOREIGN PATENT DOCUMENTS

| | | |
|---|---|---|
| EP | 0523687 | 1/1993 |
| EP | 0709973 A1 | 5/1996 |
| EP | 0715423 | 6/1996 |
| EP | 0847146 A2 | 6/1998 |
| EP | 0853393 A1 | 7/1998 |
| EP | 0860953 | 8/1998 |
| GB | 2272599 | 5/1994 |
| GB | 2351420 A | 12/2000 |
| JP | 62040895 | 2/1987 |
| JP | 63160442 | 7/1988 |
| JP | 64011428 | 1/1989 |
| JP | 02100358 | 4/1990 |
| JP | 03021884 | 1/1991 |
| JP | 05063623 | 3/1993 |
| JP | 05102907 | 4/1993 |
| JP | 6013947 | 1/1994 |
| JP | 06334577 | 12/1994 |
| JP | 07030473 | 1/1995 |
| JP | 07079187 | 3/1995 |
| JP | 07079205 | 3/1995 |
| JP | 08097762 | 4/1996 |
| JP | 08274706 | 10/1996 |
| JP | 09018484 A | 1/1997 |
| JP | 09162903 | 6/1997 |
| JP | 09182155 | 7/1997 |
| JP | 10032557 A | 2/1998 |
| JP | 10135892 | 5/1998 |
| JP | 11055713 | 2/1999 |
| JP | 11127104 | 5/1999 |
| JP | 2000031877 | 1/2000 |
| JP | 2000502218 T | 2/2000 |
| JP | 2000082938 A | 3/2000 |
| JP | 2000236290 | 8/2000 |
| JP | 2000269873 | 9/2000 |
| JP | 2001111575 A | 4/2001 |
| JP | 2002033691 | 1/2002 |
| JP | 2002111571 A | 4/2002 |
| JP | 2002271255 | 9/2002 |
| JP | 2003174394 | 6/2003 |
| JP | 2004328666 | 11/2004 |
| JP | 2005531202 | 10/2005 |
| JP | 2005531265 | 10/2005 |
| JP | 2006503481 | 1/2006 |
| JP | 2006505146 | 2/2006 |
| KR | 100610929 | 8/2006 |
| WO | WO9214339 | 8/1992 |
| WO | WO9734434 | 9/1997 |
| WO | WO9858461 A1 | 12/1998 |
| WO | WO9959264 A2 | 11/1999 |
| WO | WO0050971 A2 | 8/2000 |
| WO | WO0152447 | 7/2001 |
| WO | WO0182512 A1 | 11/2001 |
| WO | 0208857 A2 | 1/2002 |
| WO | 02008857 | 1/2002 |
| WO | 02017572 | 2/2002 |
| WO | WO03013005 A2 | 2/2003 |
| WO | 04002014 | 12/2003 |
| WO | WO2004001986 A2 | 12/2003 |
| WO | WO2004002014 | 12/2003 |
| WO | WO2004004365 | 1/2004 |
| WO | WO2004032362 | 4/2004 |
| WO | WO2004038958 | 5/2004 |
| WO | 2004062305 A1 | 7/2004 |
| WO | WO05115022 | 12/2005 |

OTHER PUBLICATIONS

IEEE Std 802.11g-2003, "Part 11: Wireless LAN Medium Access Control (MAC) and Physical Layer (PHY) specifications: Amendment 4: Further Higher Data Rate Extension in the 2.4 GHz Band." IEEE Computer Society, Published by The Institute of Electrical and Electronics Engineers, Inc., Jun. 27, 2003.

IEEE Std 802.11b-1999, "Part 11: Wireless LAN Medium Access

Control (MAC) and Physical Layer (PHY) specifications: Higher-Speed Physical Layer Extension in the 2.4 GHz Band," IEEE-SA Standards Board, Supplement to ANSI/IEEE Std. 802.11, 1999 Edition, Approved Sep. 16, 1999.

Code of Federal Regulations, Title 47 Telecommunication; "Federal Communications Commission code part 15.407," Federal Communications Commission vol.1, chapter I, part 15.407.

IEEE Std 802. 11-1999 (Reaff 2003), "Part 11: Wireless LAN Medium Access Control (MAC) and Physical Layer (PHY) Specifications," LAN MAN Standards Committee of the IEEE Computer Society; Paragraphs 7.2.3.1 and 7.2.3.9; Paragraph 15.4.6.2 and 18.4. 6.2.

IEEE Std 802.11b-1999, "Part 11; Wireless LAN Medium Access Control (MAC) and Physical Layer (PHY) specifications: Higher-Speed Physical Layer Extension in the 2.4 GHz Band," IEEE-SA Standards Board, Supplement to ANSI/IEEE Std. 802.11. 1999 Edition, Approved Sep. 16, 1999.

IEEE Std 802.11g-2003, "Part 11; Wireless LAN Medium Access Control (MAC) and Physical Layer (PHY) specifications: Amendment 4: Further Higher Data Rate Extension in the 2.4 GHz Band," IEEE Computer Society, Published by The Institute of Electrical and Electronics Engineers, Inc., Jun. 27, 2003.

IEEE Std 802.16-2001; "Part 16: Air Interface for Fixed Broadband Wireless Access Systems," IEEE Computer Society and the IEEE Microwave Theory and Techniques Society, Published by The Institute of Electrical and Electronics Engineers. Inc., Apr. 8, 2002.

IEEE Std 802, 11-1999 (Reaff 2003), "Part 11; Wireless Lan Medium Access Control (MAC) and Physical Layer (PHY) Specifications," LAN MAN Standards Committee of the IEEE Computer Society; Paragraphs 7.2.3.1 and 7.2.3.9; Paragraph 7.3.2.4; Paragraphs 15.4. 6.2 and 18.4.6.2.

Andrisano, et al., On the Spectral Efficiency of CPM Systems over Real Channel in the Presence of Adjacent Channel and CoChannel Interference: A Comparison between Partial and Full Response Systems, IEEE Transactions on Vehicular Technology, vol. 39, No. 2, May 1990.

First Office Action issued from the Chinese Patent Office in connection with corresponding Chinese application No. 200380101286.2. (corresponding U.S. Appl. No. 10/530,546).

Draft Corrigendum to IEEE Standard for Local and Metropolitan Area Networks—Part 16: Air Interface for Fixed Broadband Wireless Access Systems, IEEE P802.16-2004/Cor1/D5.

Draft IEEE Standard for Local and Metropolitan Area Networks—Part 16: Air Interface for Fixed and Mobile Broadband Wireless Access Systems; Amendment for Physical and Medium Access Control Layers for Combined Fixed and Mobile Operation in Licensed Bands.

First Report issued by IP Australia on Jul. 31, 2007 in connection with the corresponding Australian application No. 2003239577. (corresponding U.S. Appl. No. 10/516,327).

IEEE 802.16(e), Part 16: Air Interface for Fixed Broadband Wireless Access Systems, 2005, Sections 8.4.10,2.1; 8.4.10.3.2.

International Search Report-PCT/US03/039889, International Search Authority-ISA/US-May 19, 2004 (corresponding U.S. Appl No. 10/536,471).

Kannangara, et al., "Analysis of an Adaptive Wideband Duplexer with Double-Loop Cancellation," IEEE Transactions on Vehicular Technology, vol. 56, No. 4, Jul. 2007, pp. 1971-1982.

Kutlu et al., "Performance Analysis of MAC Protocols for Wireless Control Area Network," 1996 IEEE, pp. 494-499.

Mexican Office communication dated Jul. 2, 2007 issued from Mexican Patent Office for application PA/a/2004/011588 with partial translation thereof (corresponding U.S. Appl. No. 10/516,327).

Notification of the First Office Action from Chinese Patent Office dates Sep. 8, 2006 for the corresponding Chinese patent application No. 200380105267.7 (corresponding U.S. Appl. No. 10/536,471).

Office Action issued from the Mexican Patent Office dated Feb. 22, 2008 in connection with the corresponding Mexican Patent Application No. PA/a/2004/011588 (corresponding U.S Appl. No. 10/516,327).

Office communication dated Jan. 12, 2007 issued from the European Patent Office for counterpart application No. 03734136.9-1246 (corresponding U.S. Appl. No. 10/516,327).

Office communication dated Oct. 19, 2006 issued from the Mexican Patent Office for counterpart application No. PA/a/2004/011588 (corresponding U.S. Appl. No. 10/516,327).

Official communication issued from the European Patent Office dated Aug. 7, 2007 for the corresponding European patent application No. 03759271.4-2412 (corresponding U.S. Appl. No. 10/531,078).

Second Office Action issued from the Chinese Patent Office on Jul. 20, 2007 in connection with corresponding Chinese application No. 200380101286.2 (corresponding U.S. Appl. No. 10/530.546).

Specifications for 2.3 GHz Band Portable Internet Service—Physical & Medium Access Control Layer, TTAS KO-06.0082/R1, Dec. 2005.

Third Office Action issued from the Patent Office of People's Republic of China dated Jan. 4, 2008 in corresponding Chinese Patent Application No. 200380101286.2 (corresponding U.S. Appl. No. 10/530,546).

Translation of Office Action issued by Chinese Patent Office on Oct. 19, 2007 in connection with the corresponding Chinese application No. 03814391.7 (corresponding U.S. Appl. No. 10/516,327).

U.S. PTO Office Action mailed on Apr. 17, 2007 for the corresponding U.S. Appl. No. 11/339,838, now U.S Patent No. 7,230,935.

U.S. PTO Office Action mailed on Jan. 24, 2007 for the corresponding U.S. Appl. No. 11/339,838, now U.S. Patent No. 7,230,935.

U.S. PTO Office Action mailed on Nov. 21, 2006 for the corresponding U.S. Appl. No. 11/339,838, now U.S. Patent No. 7,230,935.

U.S. PTO Office Action mailed on Nov. 6, 2006 for the corresponding U.S. Appl. No. 11/339,838, now U.S. Patent No. 7,230,935.

Draft IEEE Standard for Local and Metropolitan Area Networks—Part 16: Air Interface for Fixed and Mobile Broadband Wireless Access Systems; Amendment for Physical and Medium Access Control Layers for Combined Fixed and Mobile Operation in Licensed Bands. IEEE P802. 16/E/D12. Oct. 2005.

Office Action English translation dated Jul. 4, 2008 issued Chinese Patent Office for Application No. 03814391.7.

Office Action English translation dated Jun. 29, 2009 issued from Japanese Patent Office for Application No. 2004-541532.

Translation of Office Action in Japanese application 2004-515701, corresponding to U.S. Appl. No. 10/516,327, citing WO00050971, JP2000-031877, JP2002-033691, JP2002-111571 and JP11-127104, Dated Jun. 11, 2010.

Translation of Office Action in Japanese application 2004-544751, corresponding to U.S. Appl. No. 10/531,078, citing WO00050971, JP2002-111571, JP05-102907, JP63-160442, JP2000-502218, JP10-032557 and JP2000-082983. Dated Oct. 16, 2009.

Translation of Office Action in Japanese application 2004-565505, corresponding to U.S. Appl. No. 10/563,471, citing JP08-097762 and JP2001-111575. Dated Sep. 9, 2009.

Translation of Office Action in Japanese application 2004-565505, corresponding to U.S. Appl. No. 10/563,471, citing JP08-097762, JP2001-111575, JP09-018484 and JP11-055713. Dated Oct. 7, 2010.

Translation of Office Action in Japanese application 2004-565505, corresponding to U.S. Appl. No. 10/563,471, citing JP09-018484. Dated Mar. 26, 2010.

Translation of Office Action in Korean application 2008-7026775, corresponding to U.S. Appl. No. 11/730,361, citing KR100610929 Dated Aug. 30, 2010.

Translation of Office Action in Japanese application 2009-503041, corresponding to U.S. Appl. No. 11/730,361, citing WO05115022, JP10-135892, JP2005-531265, 2006-503481, JP2005-531202 AND JP2006-505146. Dated Oct. 26, 2010.

Translation of Office Action in Korean application 2009-7010639, corresponding to U.S. Appl. No. 12/439,018, citing WO01052447 and US2004/0208258, Dated Nov. 15, 2010.

* cited by examiner

WIRELESS NETWORK REPEATER

CROSS REFERENCE TO RELATED APPLICATIONS

This application is related to and claims priority from pending U.S. Provisional Application No. 60/433,171 filed Dec. 16, 2002, and is further related to PCT Application PCT/US03/16208 entitled WIRELESS LOCAL AREA NETWORK REPEATER, the contents of which are incorporated herein by reference.

FIELD OF THE INVENTION

The present invention relates generally to wireless local area networks (WLANs) and, particularly, the present invention relates to channel selection for a frequency translating repeater connecting to an Access Point (AP).

BACKGROUND OF THE INVENTION

Because of increasing popularity, there is an ongoing need to extend the range of wireless local area networks (WLAN), including but not limited to WLANs described and specified in the 802.11, 802.16 and 802.20 standards. While the specifications of products using the above standard wireless protocols commonly indicate data rates on the order of, for example, 11 MBPS and ranges on the order of, for example, 100 meters, these performance levels are rarely, if ever, realized. Performance shortcomings between actual and specified performance levels have many causes including attenuation of the radiation paths of RF signals, which are typically in the range of 2.4 GHz or 5.8 GHz in an operating environment such as an indoor environment. Base or AP to receiver or client ranges are generally less than the coverage range required in a typical home, and may be as little as 10 to 15 meters. Further, in structures having split floor plans, such as ranch style or two story homes, or those constructed of materials capable of attenuating RF signals, areas in which wireless coverage is needed may be physically separated by distances outside of the range of, for example, an 802.11 protocol based system. Attenuation problems may be exacerbated in the presence of interference in the operating band, such as interference from other 2.4 GHz devices or wideband interference with in-band energy. Still further, data rates of devices operating using the above standard wireless protocols are dependent on signal strength. As distances in the area of coverage increase, wireless system performance typically decreases. Lastly, the structure of the protocols themselves may affect the operational range.

One common practice in the mobile wireless industry to increase the range of wireless systems is through the use of repeaters. However, problems and complications arise in that for some systems and devices, receivers and transmitters operate at the same frequency as in a WLAN (Wireless Local Area Network) or WMAN (Wireless Metropolitan Area Network) utilizing, for example, 802.11 or 802.16 WLAN wireless protocols. In such systems, when multiple transmitters operate simultaneously, as would be the preferred case in repeater operation, difficulties arise. Other problems arise in that, for example, the random packet nature of typical WLAN protocols provides no defined receive and transmit periods. Because packets from each wireless network node are spontaneously generated and transmitted and are not temporally predictable packet collisions may occur. Some remedies exist to address such difficulties, such as, for example, collision avoidance and random back-off protocols, which are used to avoid two or more nodes transmitting packets at the same time. Under the 802.11 standard protocol, for example, a distributed coordination function (DCF) may be used for collision avoidance.

Such operation is significantly different than the operation of many other cellular repeater systems, such as those systems based on IS-136, IS-95 or IS-2000 standards, where the receive and transmit bands are separated by a deplexing frequency offset. Frequency division duplexing (FDD) operation simplifies repeater operation since conflicts associated with repeater operation, such as those arising in situations where the receiver and transmitter channels for all networked devices are on the same frequency, are not present.

An additional complication arising from the use of repeaters in WLAN environments is the random nature of data packet transmissions, which often occur in the various WLAN protocols. When a WLAN is functioning without centralized coordination as is typical, it is operating in accordance with a DCF as noted above. In DCF operation, packets initiated from each node on the wireless network are generated spontaneously with no predictable receive and transmit slots. Several mechanisms may be used to avoid collisions associated with communication units transmitting packets at the same time. Some mechanisms, referred to as Carrier Sense Multiple Access with Collision Avoidance (CSMA/CA) and the Network Allocation Vector (NAV), are used by the distributed coordination function (DCF), governing the primary "rules" for enabling the coordination of the transmission of random packets from different stations. Because transmissions in such an uncoordinated environment are unpredictable in that they may come at any time from any station, the challenge to repeater architectures is significant. An in addition to challenges associated with collisions, other challenges exist associated with, for example, feedback or the like on channels which are used by more than one repeater.

Although traditional repeaters, such as those used in IS-95 cellular systems, employ directional antennas and physical separation of receive and transmit antennas to achieve the necessary isolation to prevent oscillatory feedback, such a solution is not practical for WLAN repeaters. The combination of prohibitive costs and the fact that, for indoor environments, isolation is less effective because of reflections caused by objects in close proximity to the antennas, rule out such solutions for indoor WLAN repeaters. Thus, several known approaches to providing repeaters in WLANs, and specifically to providing 802.11 compliant repeaters include providing two Access Points (APs) in a box with a routing function between them; and providing a store and forward repeater (SF Repeater), both of which approaches are reflected in products available on the market today.

One system, described in International Application No. PCT/US03/16208, incorporated by reference herein, and commonly owned by the assignee of the present application, resolves many of the above identified problems by providing a repeater which isolates receive and transmit channels using a frequency detection and translation method. The WLAN repeater described therein allows two WLAN units to communicate by translating packets associated with one device at a first frequency channel to a second device using a second frequency channel. The direction associated with the translation or conversion, such as from the first frequency channel associated with the first device to the second frequency channel associated with the second device, or from the second frequency channel to the first frequency channel, depends upon a real time configuration of the repeater and the WLAN environment. For example, the WLAN repeater may be configured to monitor both frequency channels for transmissions and, when a transmission is detected, translate the signal received on the first frequency channel to the other frequency channel, where it is transmitted to the destination. It is important to note that the frequency translating repeater described in International Application No. PCT/US03/16208 acts in near real time to receive, boost and retransmit packets and while addressing many of the problems in the art, lacks capabilities such as store and forward.

Not only does an isolated frequency translating repeater such as that described in International Application No. PCT/US03/16208 solve many of the above described issues associated with asynchronous transmission, indeterminate packet length, and use of the same frequency for frequency transmission/reception, but such repeaters are additionally well suited for use in accordance with the 802.11a, e.g. the 5 GHz OFDM, standard which is currently the standard providing the highest data rate network, up to 54 MBPS, and the highest frequency, 5 GHz. While providing attractive data rate and frequency parameters, the 802.11a repeater is inherently limited in range. Problems arise due to the range limitations since, while many new applications involving video and audio are only possible using the higher performance available under 802.11a making the use of 802.11a compliant repeaters highly desirable, the range limitations hinder usefulness and limit widespread acceptance. Such limitations are disappointing since the 802.11a frequency bands are well suited for frequency translation for the above mentioned reasons, and due to the significant amount of allocated spectrum available for use within the band. It should be noted that there are presently 12 802.11a compatible frequency channels available in the US with another 12 planned for allocation by the FCC in the near future.

It should further be noted that while frequency translating repeaters as described above are desirable, the application of frequency translating repeaters are not limited to systems compliant with 802.11a standards. For example, as is well known to those of ordinary skill in the art, 802.11b and 802.11g are standards specifying transmission protocols for 2.4 GHz systems. Products based on these standards may be used with repeaters in at least two ways. For example, in a bridging configuration, a repeater may use any combination of non-overlapping frequency channels such as channel 1, 6, and 11 for standard IEEE based networks. The use of adjacent channels is possible due to the ability to use directional antennas in combination with the repeater, or a reduction in repeater transmission power. In the Basic Service Set (BSS) mode which is a common configuration mode for a typical AP, the two most separated channels, e.g. channels 1 and 11, are used to minimize the impact of the impracticability of directional antennas for such an application. As will be apparent, in addition to 802.11a, 802.11b, and 802.11g applications, the above described frequency translating repeater may also be used in connection with other configurations and in connection with other WLANs and WLAN environments, and other TDD protocols.

In many WLAN environments, an exemplary repeater may have a plurality of APs operating using a number of frequency channels within signal range of the repeater as determined, for example, by the type of communication standard in use. For example, presently there are 11 channels available for use in systems designed in accordance with the 802.11b and 802.11g standards with 3 of the 11 channels non-overlapping and 12 channels for use in systems designed in accordance with the 802.11a standard. Systems designed and operating in accordance with other WLAN standards may allow a different number of channels, or may alter channel availability by increasing or decreasing the number of channels as frequencies become expanded or constricted. It should be noted however, if a repeater is not pre-assigned to operate or "slaved" with a particular AP, difficulties arise since the repeater cannot know which AP to service resulting in feedback problems, erroneous transmissions or significant interference between the repeater or repeaters and various APs in the network.

During initial repeater power-up, the determination of which channels an AP and its repeater operate on may be influenced by, inter alia, regulations. Accordingly, repeater frequency channels may be chosen based on maximum transmit power levels, as allowed by FCC or other regulatory bodies. For example, in the U-NII bands for operation in the United States, the maximum allowable transmit power for CH36-48 is 50 mW, for CH52-64 is 250 mW, and for CH149-161 is 1 W. In an exemplary repeater environment therefore, it is possible to receive a signal on a frequency channel associated with one of the lower power levels and choose a frequency channel on a different band allowing a higher transmit power level to be used for the retransmitted signal. It will further be appreciated that in addition to allowing retransmission of signals at a higher signal power level may relate directly to increased system interference, especially in WLANs with overlapping channels, such as those operating in accordance with 802.11b. Thus the decision regarding which channels an exemplary AP and repeater should select could be pre-programmed during manufacturing. Pre-programming is limited however, in that dynamic approaches associated with, for example, limiting local interference through power adjustment, as described above, can not be as easily achieved with simple pre-programming. Moreover, during operation, an AP may be switched to a different channel after repeater configuration due to interference from a new source or from other unforeseeable problems. For example, if additional WLAN nodes, clients, APs, or the like, are added to an existing WLAN, network optimization may dictate changing certain AP channels. Undesirable consequences arise however in that repeaters originally configured at the physical layer for particular frequency channels and the like, as described above would have to be reconfigured, reconnected, or the like to the AP software.

Further problems and issues with repeater configuration arise in connection with regulations promulgated by the European Union (EU) in the form of 802.11h certification requirements. Accepted mechanisms for satisfying certification requirements include dynamic channel selection and transmit power control. It is further believed that the 802.11h standard will eventually contain unique requirements that will necessitate changes to the current generation of chipsets to enable RADAR detection. Under the proposed standard, a "master" device, such as an AP, would be required to detect the presence of interference from RADAR sources, and generate messaging directing "slave" devices to change to a specified channel. Under the proposed standard, slave devices must receive these messages and follow the directed channel change. Thus a conventional repeater would fail to comply with the proposed standards of detecting the presence of RADAR energy when selecting possible repeating channels.

To effect a frequency change under the proposed standard, an AP would send a message indicating the desired new frequency channel for a station to switch to causing an error condition in the station equipment as the repeater begins operating on the new frequency, and repeating onto another frequency including possibly the frequency channel switched from. A conventional repeater will experience difficulty knowing which channel the AP is on. Thus, as can be seen, it would be preferable for a repeater to be programmed in the field or operating environment to minimize interference, to provide system compatibility, or to optimize other factors when setting up or adjusting the network.

It should be noted that conventional SF repeaters are typically provided to the consumer with configuration software. The AP is loaded with corresponding software which determines the channels used by the AP. Channel information is then communicated by the consumer during initial configuration to the SF repeater to configure the repeater in kind. Problems arise however, in that such systems are difficult to implement for the consumer as they require some basic knowledge, or at least data interpretation, of the WLAN parameters.

It should be appreciated that in general, repeaters will be used where no wired LAN, such as an Ethernet connected LAN or the like, exists to provide a backhaul channel for additional APs. A SF repeater as noted above, consists of a commercial AP with additional software allowing 802.11 packet routing to and from another AP, Station devices, other nodes and the like. SF repeaters are available from various manufacturers including Cisco Systems, Inc. of San Jose Calif., Intel Corporation of Santa Clara Calif., and the like. It should be noted that the store and forward feature is typically only included in enterprise class APs having a Manufacturer's Suggested Retail Price averaging around $750. Some residential class store and forward APs are available with a MSRP averaging around $90 and able to perform the SF repeater function.

SUMMARY OF THE INVENTION

An exemplary frequency translating repeater of the present invention solves the spontaneous transmission problem and the isolation of the transmitter from receiver using a unique frequency detection and translation technique in a WLAN environment. The exemplary repeater allows two or more WLAN units or stations to communicate by translating packets from a first frequency channel, used by one device, to a second frequency channel, used by a second device. The direction of the conversion from channel A to channel B or from channel B to channel A is dynamically configured. The repeater monitors both channels for transmissions and once a transmission on a channel is detected, the repeater is configured to translate the received signal to the other channel, where it is re-transmitted.

If more than one AP is present on different channels within the WLAN environment, the exemplary repeater may be wirelessly connected to the desired AP in a number of manners, as will be described in greater detail below. Generally, several techniques may be used to configure the exemplary repeater to work with a specific AP. For residential applications a user may locate and power-up the exemplary repeater in close proximity to the target AP. In accordance with various exemplary embodiments, a user may press a control button for a period of time, say 5 seconds. During the control interval the exemplary repeater preferably scans all available frequency channels and available APs, choosing the "best" frequency channel and AP, e.g. the frequency channel with the strongest signal (Beacon) or best quality metric such as Signal to noise ratio from the desired AP. The exemplary repeater then stores the best channel number as its primary operating frequency. In addition, the repeater may store other information specific to that Access Point, if available. Those of ordinary skill in the art will recognize that while a control button is one way to initiate the configuration and control interval as described, other routine/start-up techniques and mechanisms may be used.

In accordance with various embodiments, the exemplary repeater may have additional network management capabilities, and may further be able to decode packets for use in remote network maintenance functions. Accordingly, the MAC ID, BSS_ID, and other information will be stored associated with the "preferred" AP in addition to receive power, channel number, and beacon interval. After such values are determined and stored, the repeater is now configured for operation in the WLAN environment, and may be unplugged. It will further be appreciated that the exemplary repeater may be moved to a different location and will maintain communications with or "track" the preferred AP. An example of this would be to unplug the repeater and plug it into a new location, with the repeater reestablishing operation with the preferred AP.

In accordance with various alternative embodiments, the exemplary repeater may be initialized as can be considered, for illustrative purposes, with the exemplary repeater in a carrier network. A carrier network for the purposes of discussion herein, can be defined as a coordinated network operating under predefined parameters. For use in carrier environments, the exemplary repeater can be programmed to detect the interval timing of, for example, beacon probes, and with appropriate software, a MAC ID, or BSS_ID may be tracked. APs associated with the carrier environment may be programmed with unique beacon intervals, and BSS_IDs. Alternatively, the exemplary repeater may be programmed to select channels with an AP MAC address chosen from a stored list. Accordingly, the exemplary repeater is immediately capable of self-configuring "out of the box."

Thus an exemplary repeater in accordance with various embodiments described herein, solve both the isolation issue, allowing a small inexpensive unit, and the spontaneous transmission problem as a repeater it monitors and reacts to channel activity. The exemplary repeater of the present invention further facilitates configuration within a network and rapid reconfiguration if an AP or the network is reconfigured or a new environment is encountered.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages in accordance with the present invention.

DETAILED DESCRIPTION OF THE INVENTION

Figure 1:
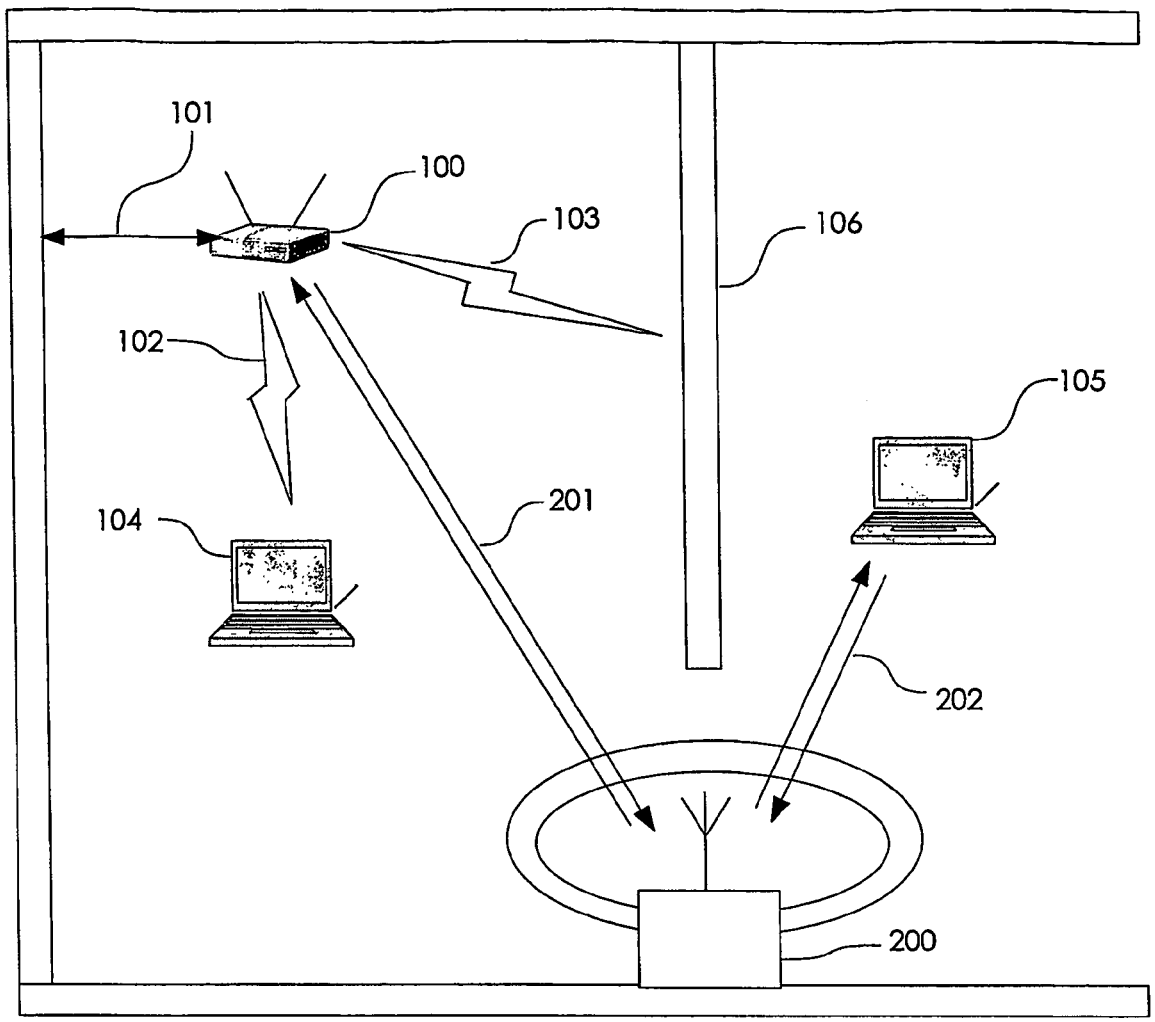
FIG. 1 is a diagram illustrating a WLAN including an exemplary repeater in accordance with various exemplary embodiments.

Referring now to FIG. 1, a wide area connection 101, which could be, for example, an Ethernet connection, a T1 line, a wideband wireless connection or any other electrical connection providing a data communications path, may be connected to a wireless gateway, or access point (AP) 100. The wireless gateway 100 sends RF signals, such as IEEE 802.11 packets or signals based upon Bluetooth, Hyperlan, or other wireless communication protocols, to client units 104, 105, which may be personal computers, personal digital assistants, or any other devices capable of communicating with other like devices through one of the above mentioned wireless protocols. Respective propagation, or RF, paths to each of the client units 104, 105 are shown as 102, 103.

While the signal carried over RF path 102 is of sufficient strength to maintain high-speed data packet communications between the client unit 104 and the wireless gateway 100, the signals carried over the RF path 103 and intended for the client unit 105 would be attenuated when passing through a structural barrier such as walls 106 or 107 to a point where few, if any, data packets are received in either direction if not for a wireless repeater 200, the structure and operation of which will now be described.

To enhance the coverage and/or communication data rate to the client unit 105, wireless repeater 200 receives packets transmitted on a first frequency channel 201 from the wireless gateway 100. The wireless repeater 200, which may be housed in an enclosure typically having dimensions of, for example, 2.5"×3.5"×0.5", and which preferably is capable of being plugged into a standard electrical outlet and operating on 110 V AC power, detects the presence of a packet on the first frequency channel 201, receives the packet and re-transmits the packet with more power on a second frequency channel 202. Unlike conventional WLAN operating protocols, the client unit 105 operates on the second frequency channel, even though the wireless gateway 100 operates on the first frequency channel. To perform the return packet operation, the wireless repeater 200 detects the presence of a transmitted packet on the second frequency channel 202 from the client unit 105, receives the packet on the second frequency channel 202, and re-transmits the packet on the first frequency channel 201. The wireless gateway 100 then receives the packet on the first frequency channel 201. In this way, the wireless repeater 200 is capable of simultaneously receiving and transmitting signals as well as extending the coverage and performance of the wireless gateway 100 to the client unit 105.

To address the difficulties posed by obstructions as described above and attendant attenuation of the signal strength along obstructed paths and thus to enhance the coverage and/or communication data rate to client unit 105, exemplary wireless repeater 200, as shown in FIG. 1, may be used to retransmit packets beyond a range limited by propagation path constraints through, for example, frequency translation. Packets transmitted on a first frequency channel 201 from AP 100 are received at repeater 200 and re-transmitted, preferably with a greater power level, on a second frequency channel 202. Client unit 105 preferably operates on second frequency channel 202 as if AP 100 were also operating on it, such as with no knowledge that AP 100 is really operating on first frequency channel 201 such that the frequency translation is transparent. To perform return packet operations, repeater unit 200 detects the presence of a transmitted return packet on second frequency channel 202 from client unit 105, and is preferably configured to receive the packet on second frequency channel 202, and to retransmit the data packet to, for example AP 100, on first frequency channel 201.

Wireless repeater 200 is preferably capable of receiving two different frequencies simultaneously, such as first frequency channel 201 and second frequency channel 202 determining which channel is carrying a signal associated with, for example, the transmission of a packet, translating from the original frequency channel to an alternative frequency channel and retransmitting the frequency translated version of the received signal on the alternative channel. Details of internal repeater operation may be found in co-pending PCT Application No. PCT/US03/16208.

Repeater 200 may thus receive and transmit packets at the same time on different frequency channels thereby extending the coverage and performance of the connection between AP 100 and client unit 105, and between peer-to-peer connections such as from one client unit to another client unit. When many units are isolated from one another, repeater unit 200 further acts as a wireless bridge allowing two different groups of units to communicate where optimum RF propagation and coverage or, in many cases, any RF propagation and coverage was not previously possible.

Figure 2:
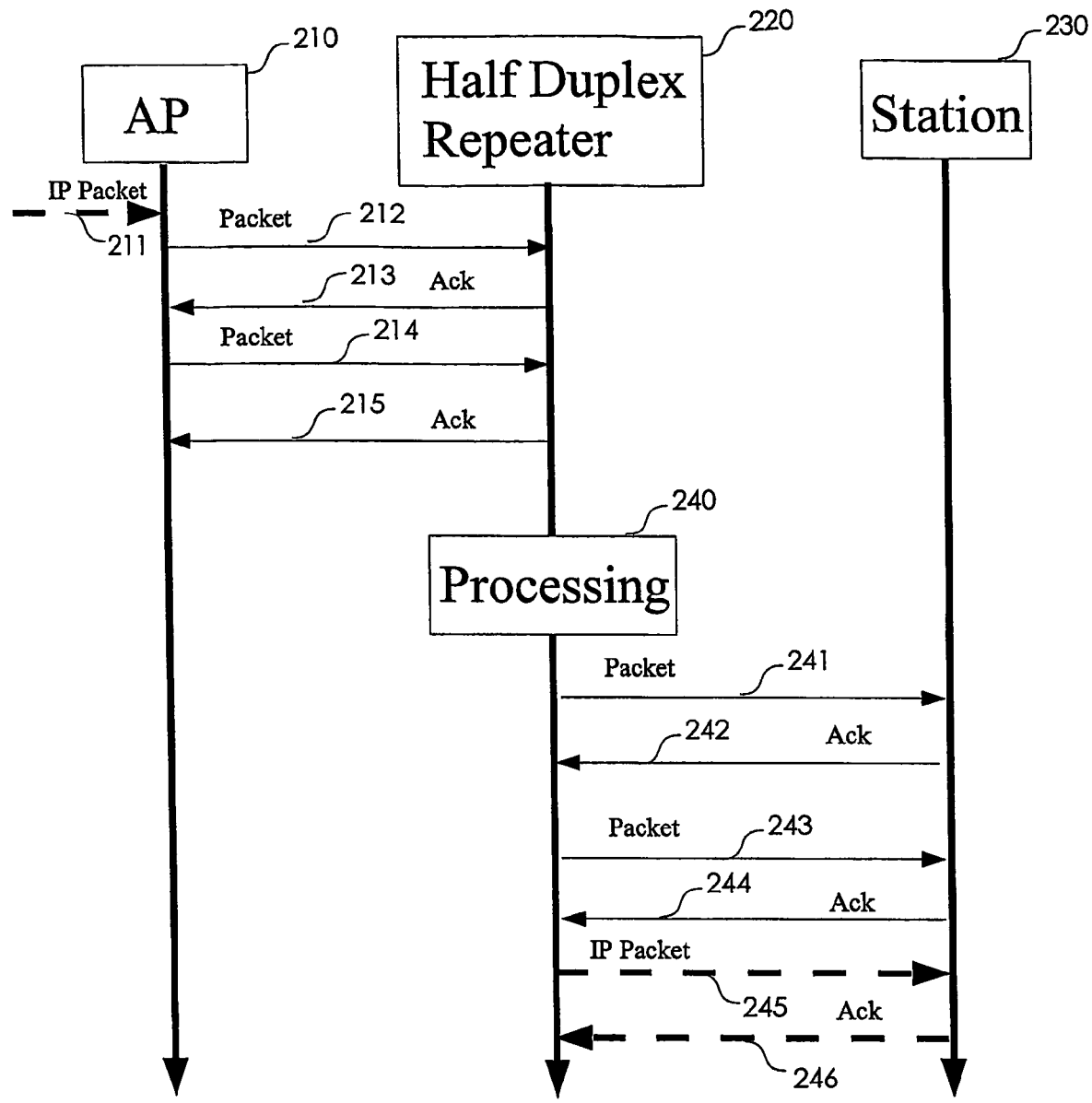
FIG. 2 is a diagram illustrating exemplary packet flow associated with a store and forward repeater.

As described above with regard to conventional approaches, it will be appreciated that the placement of two APs in a single box basically provides an entire new system alternative instead of providing an improved repeater. Being relatively expensive, two APS in a box requires substantial hardware and firmware for providing multiple access points rather than adding repeaters, the solution adds stripped-down access points. Further, with commercially available APs, the channel linearity and selectivity prevents a transmitter on one channel from being physically near a receiver on another channel without significant performance impacts. This prevents a reasonable form factor for the residential or enterprise markets. Regarding store and forward repeaters, FIG. 2 is useful in illustrating the flow of packets in a typical store and forward type repeater interaction. When an AP 210 has an IP packet, such as packet 211, to transmit to station 230, it will be transmitted to half-duplex repeater 220 which as will be appreciated is a store and forward repeater. Repeater 220 receives each of exemplary 802.11 packet segments 212 and 214, providing acknowledges (ACKs) 213 and 215 and then after processing in block 240, can pass segments 241 and 243 on to station 230, or may assemble them into a complete IP packet. For the 802.11 standard wireless distribution function (WDS) half duplex repeater 220 will attempt to transmit packet segment 212 as soon as the ACK 213 is transmitted in accordance with operation as a Layer 2 bridge or repeater. It should be noted that a relatively high probability exists that the channel control will be retained by AP 210, based on the operation of the Distributed Coordination Function (DCF) protocol, and packet segment 214 will be sent to the repeater 220 first, prior to the re-transmission of, for example, packet 212. If the entire IP packet is assembled as required in accordance with Layer 3 operation as a routing repeater, repeater 220 performs network address translation (NAT) and transmits the IP packet to the end station. Since the station and the AP operate on the same frequency, and the SF Repeater has a single transceiver it will operate half-duplex meaning that half the time the SF repeater will be talking to the AP and the other half it will be talking to the target Station. The result of this will be a 50% minimum reduction in the network throughput as compared to an AP to Station network without the SF repeater. Further, more inherent cost is associated with such an approach, as compared to, for example, an analog repeater, since the use of base band, MAC, and network layer processing components is required. Thus the above described disadvantages result in reduced performance, increased delay, and increased cost.

Figure 3:
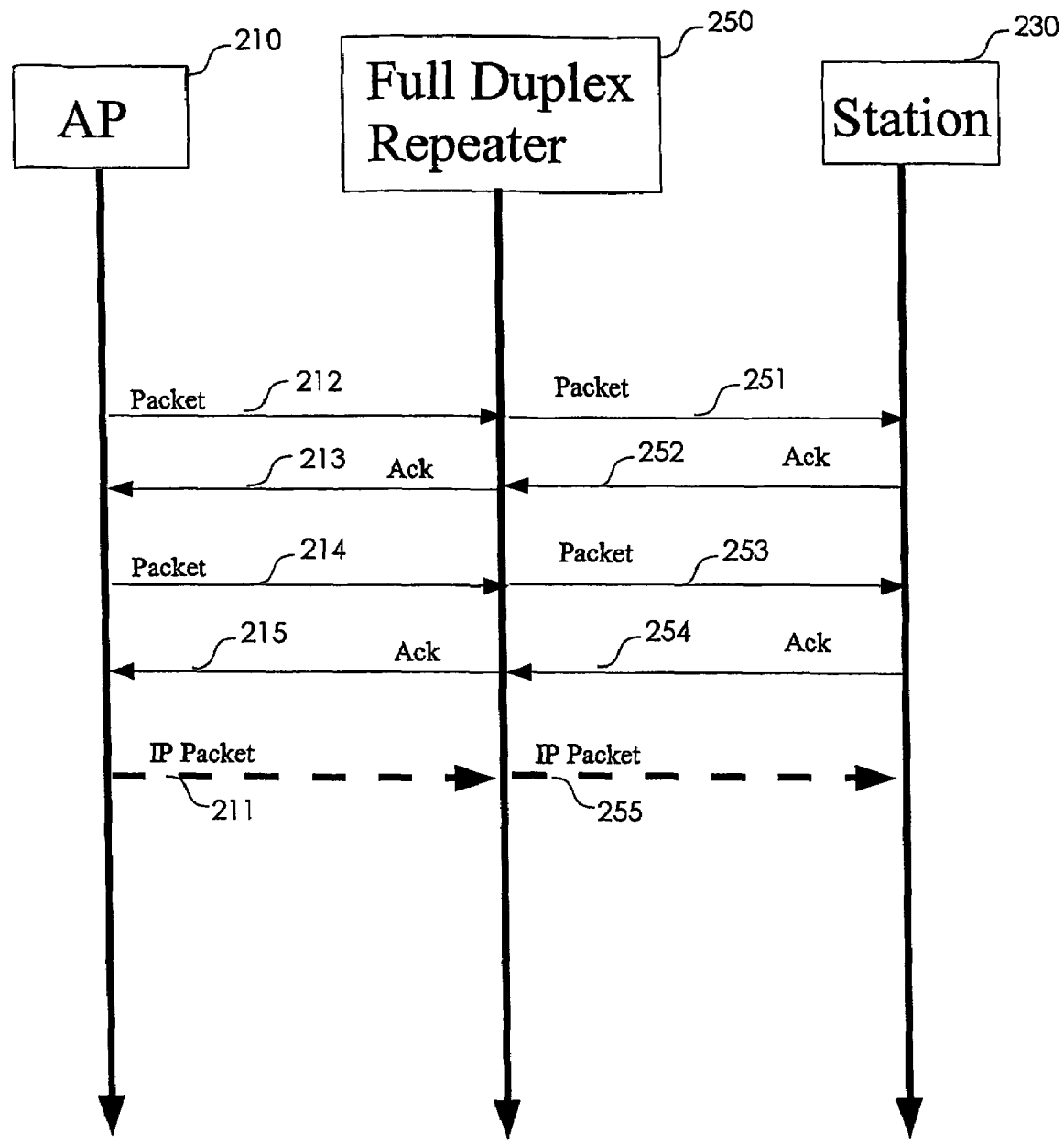
FIG. 3 is a diagram illustrating exemplary packet flow associated with an exemplary repeater of the present invention.

FIG. 3 shows the packet flow for an exemplary repeater 250 in a wireless local area network containing AP 210 and remote station 230. Since the repeater 250 is capable of full duplex operation, and uses two independent frequency channels, there is no time penalty for forwarding packet segments 212 and 214 or IP packet 211 as forwarded packet segments 251 and 253 and forwarded IP packet 255. It should be noted that acknowledges 213, 214, 252, and 254 may be returned from station 230 to AP 210 as would be understood by one of ordinary skill. Delay is reduced in such a configuration since repeater 250 can start transmitting prior to receiving, for example, the entire packet. Most or all of the throughput capability of the link is thereby retained, and repeater 250 acts like, for example, an Ethernet hub, since it allows traffic on separate links to be routed to communicating WLAN devices, e.g. AP 210 and station 230. Repeater 250 allows devices on separate frequency channels to receive each other's transmissions with significant cost advantages since base band, MAC, and network processing components are not required.

Thus an exemplary repeater architecture allows devices on independent frequency channels to "hear" each other, further allowing more users to share a single AP or backhaul connection. Carrier Sense Multiple Access (CSMA) mechanisms such as DCF described above will work transparently though the repeater and the MAC protocol works normally. In accordance with various preferred exemplary embodiments of the present invention, several techniques for initial AP channel selection may be used to configure repeater 250 to work with a specific access point such as AP 210.

Figure 4:
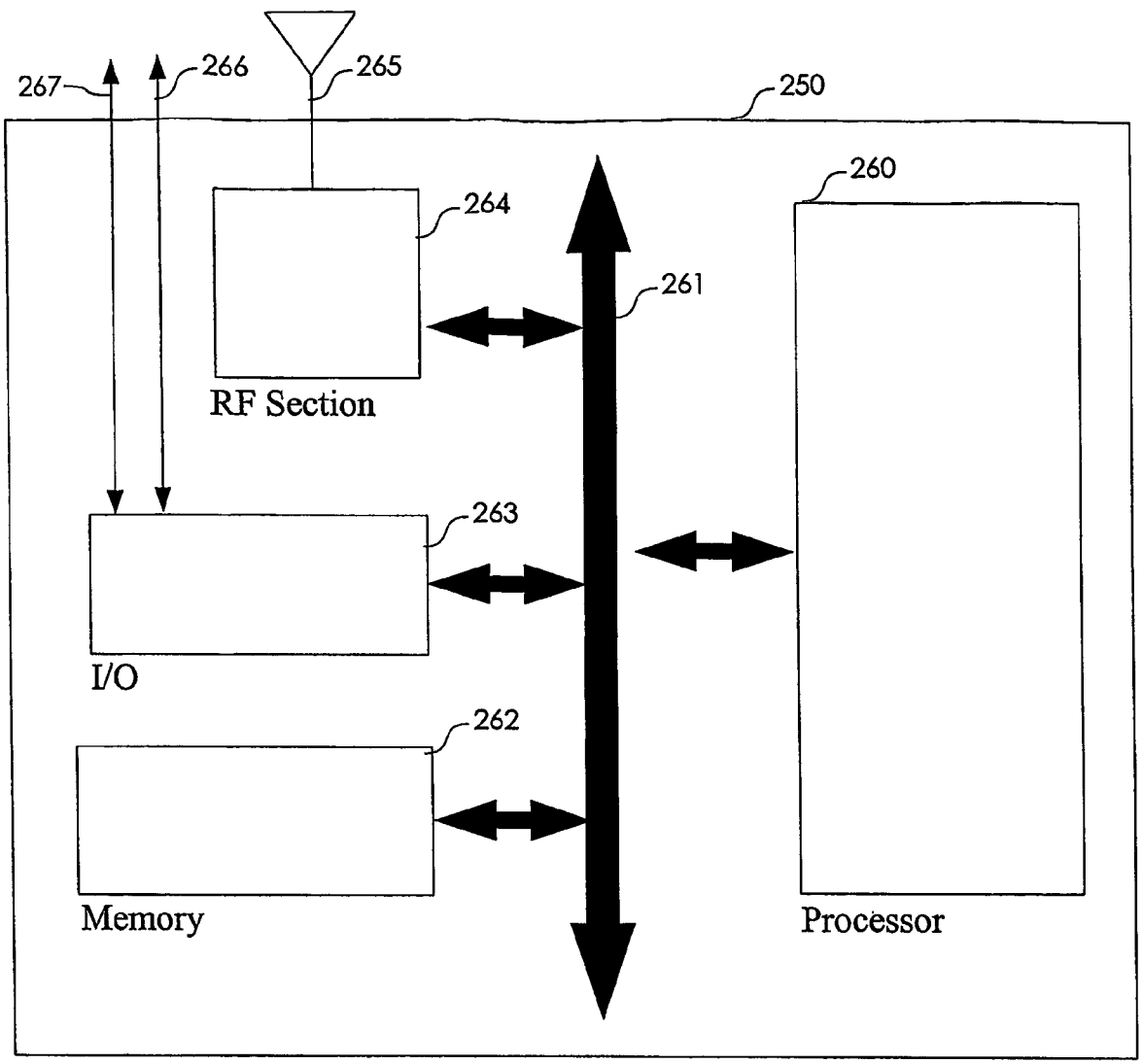
FIG. 4 is a block diagram illustrating components associated with an exemplary repeater.

As described above, a simple approach to initialization, as shown in block diagram of the exemplary repeater illustrated in FIG. 4. Exemplary repeater 250 may preferably be equipped with processor 260, which may be a general purpose microprocessor, dedicated processor, or the like as would be appreciated by one of ordinary skill in the art, interconnection 261, which is preferably a bus or the like, for carrying digital, analog, and other control and information signals throughout repeater 250, memory 262, which may be a standard memory, storage device, or the like with suitable access speeds matched to the operating frequencies of processor 260, RF section 264 with antenna 265 which may be a transmit and receive antenna, and I/O lines 266 and 267 for providing, through I/O section 263, input such as control switch input, and output such as display output or the like to inform a user as to the status of repeater 250, or the like. It will be appreciated that I/O section 263 can be a general purpose I/O processor or processor circuit with appropriate "front end" circuitry (not shown) for handling input from switches and the like. It will further be appreciated that I/O section 263 can be be incorporated into processor 260 directly with I/O lines 266 and 267, for example, connected directly to general purpose IO pins. It will still further be appreciated that memory 262 may also be integrated into processor 260 or processor 260 may be equipped with an internal memory (not shown) as is well known to those of ordinary skill in the art.

During operation, a user preferably plugs repeater 250 into a wall electrical outlet (not shown) close in proximity to a target AP, such as AP 210 in FIG. 2 and FIG. 3. A user may press a control button or provide other input to I/O port 267 for an interval of time, such as for example, 5 seconds. It should be noted that the time interval should be sufficient to allow proper characterization and scanning of frequency channels. Alternatively, the act of powering up repeater 250 may automatically begin an initialization sequence. During initialization, repeater 250 scans all available channels in the WLAN environment, choosing the best frequency channel characterized as the frequency channel from the desired AP having the strongest signal or best quality signal as determined, for example, by way of beacon transmission associated therewith. Repeater 250 stores the channel number and other relevant information, for example, in memory 262 to use for repeater operation.

Some versions of repeater 250 may have added network management capabilities, and will be able to decode packets, for use in remote network maintenance functions. In such embodiments, MAC ID, BSS_ID, and other information will be stored in repeater memory 262 as the "preferred" AP in addition to receive power, channel number, beacon interval, and the like. Repeater 250 is now configured as a slave to an AP 210, and may be unplugged moved to a desired location where repeater 250 will then "tack" the preferred AP 210.

For deployments in carrier environments, an exemplary repeater can be programmed to detect the interval timing of beacon probes, and alternatively or additionally with appropriate software, the MAC ID, or BSS_ID may be tracked. APs from within the carrier environment may be programmed with unique beacon intervals, and BSS_IDs. Additionally, exemplary repeater 250 may be programmed to select channels with an AP MAC address chosen from a list stored, for example, in memory 262 making repeater 250 capable of self-configuring "out of the box." The repeater of the present invention so configured may be used in many different packet based asynchronous wireless networks. In accordance with one preferred embodiment, an exemplary repeater may be used in an 802.11a standard environment.

In 802.11a environments, an optional MAC message may be used by some access points called the DS Parameters message for specifying which channel the direct sequence spread spectrum wave form, in accordance with 802.11b standard, is transmitted on. A more complete description of operation of exemplary repeaters in an environment using DS Parameter messages can be found in a related application co-owned by the assignee of the present application entitled: "WIRELESS LOCAL AREA NETWORK WITH REPEATER FOR ENHANCING NETWORK COVERAGE", International Application No. PCT/US03/28558, the contents of which are incorporated herein by reference. If the DS Parameter message is used by a particular AP, a software configuration parameter change in the AP or a driver update to the stations may be required for proper repeater functionality. Alternatively, exemplary repeaters with minimal station card capability having network management functionality incorporated thereinto are able to receive and transmit overhead messages and are further able to receive beacon signals containing, for example, DS_Parameters message. New beacon signals may be re-transmitted on the repeated frequency channel with a corrected channel number contained in the new DS_Parameters message section in the new beacon signal. Alternatively, in accordance with 802.11a, the DS Parameters message may be removed entirely from the newly generated bacon signal which is then transmitted on the repeated channel. Since the DS_Parameters message is optional in accordance with the 802.11a standard, removing the message does not affect compliance. Thus an exemplary repeater with a network management MODEM incorporated thereinto would be capable of generating "spoofed" beacon signals. For more detail on the structure of the 802.11 beacon messages refer to co-pending application "WIRELESS LOCAL AREA NETWORK WITH REPEATER FOR ENHANCING NETWORK COVERAGE", International Application No. PCT/US03/28558. Spoofing in accordance with various exemplary embodiments preferably involves receiving beacon information, modifying beacon information to include a new frequency channel, for example in the DS_Parameters message or the like channel indication, and transmitting the modified beacon on a different frequency channel.

For repeaters configured in accordance with 802.11b and 802.11g standards, the MAC messaging requires the use of the "DS Parameters message" which may cause some complications. It should be noted that a network management MODEM function is preferably required to perform the beacon spoofing function, for receiving the BSS_ID, MAC Address and other beacon information and synthesizing new beacon information on the new repeater channel with a corrected DS_Parameters message and allowing no modifications to the client or AP. While the above description relates to initial configuration of exemplary repeater 250, reconfiguration of repeater 205 may also be required periodically. For example, as described above, recent discussions have been held regarding revisions to the 802.11a standard to the 802.11h standard. The revisions are intended to bring the 802.11 specification into conformity with regulatory issues driven by the European Union (EU) certification requirements. As described above, the mechanisms used to satisfy these requirements include dynamic channel selection and transmit power control. In the currently planned 802.11h standard, a master device, preferably an AP, is required to detect the presence of RADAR, and generate messaging directing slave devices, such as repeaters and stations to change to a specified channel. Slave devices must receive these messages and follow the directed channel change. While the exemplary repeater described herein may need to be configured to detect the presence of in-band RADAR energy when selecting possible repeating channels, it will be appreciated that the repeater architecture is well suited for RADAR detection since detection is a core function thereof.

With 802.11h the AP may change channels if RADAR or other interference is present. To effect frequency change, the AP will send a message indicating the desired frequency the station should go to. Absent the present invention, this would cause an error condition with the station as the repeater will operate on this new frequency, and repeat onto another frequency (possibly the current one). The repeater must determine which channel the AP went to, and the Station must connect to the new repeater channel.

In accordance with various embodiments, an exemplary repeater preferably monitors all channels periodically keeping a history of APs detected on different channels. It will be appreciated that conventional detection is preferably based on received power, frequency channel, beacon interval, and other attributes. The detection and storage of such information is more fully described in co-pending application entitled: "REDUCING LOOP EFFECTS IN A WIRELESS LOCAL AREA NETWORK REPEATER", International Application No. PCT/US03/29117. For exemplary repeaters which include a maintenance function, as further described herein below, a MAC address and BSS_ID will preferably be stored, for example, in memory 262 in what is called a "scan table." During initial configuration, a preferred AP is designated, as previously described. When AP 210 changes frequency, exemplary repeater 250 detects that beacons from the current AP are not present on the AP channel. Other frequency channels are then scanned and, in accordance with various embodiments, AP channels previously present in the scan table are preferably eliminated. New APs may likewise be qualified based on received power of the beacon message, BSS_ID, and in some cases MAC address.

It will be appreciated that in accordance with various exemplary embodiments, any available criteria may be used to identify the channel to which an AP has changed, allowing an exemplary repeater enhanced ability to track an AP with which it is operating. An exemplary maintenance function will preferably receive 802.11 beacons and use the MAC Address and BSS_ID to track the AP. Further, modified beacon signals may include an indication of the intent of the AP to change channels and may also include the channel number the AP will change to prior to actually changing channels. It will be apparent that information associated with the impending channel change may also be used to "track" the AP. Additionally, the exemplary maintenance function which is preferably capable of transmitting 802.11 beacons from, for example, exemplary repeater 250 to station 230 on the repeated frequency channel may transmit an indication of the impending change and an indication of the new repeated frequency channel, to station 230 and other stations to allow for a transition to a new repeated frequency.

Station 230 preferably establishes a connection to a new repeater channel as follows. After station 230 changes frequency channels, as directed, for example, by AP 210 via repeater 250 using a modified beacon, station 230 will no longer receive any signal since repeater 250 will be operating on a different channel, translating the AP channel to a repeater channel different from the new frequency channel directed by AP 210. Station 230 will re-scan and find beacons on the new repeater channel with the correct BSS_ID and preferably the same MAC address. Since the IP address is maintained at station 230, the IP session associated with the connection between AP 210 and station 230 will remain intact. In the case of best effort delivery Quality of Service, using, for example, TCP, packet recovery will be automatic and implementation specific, but will be required as a baseline error recovery mode in accordance with the channel change procedures specified in 802.11h.

The various exemplary embodiments described herein may be used in multiple markets such as: where remote network management functions are desirable, where a simple observable diagnostic approach is needed, such as the channel scanning technique described above. For many markets, such as wide area wireless Internet service providers (WWISPs), a remote management function may be desirable. Thus in accordance with various exemplary embodiments, remote status and health monitoring of repeater 250 is preferred. The functions associated with remote network management preferably include: health and status monitoring which is required in some systems, channel selection and configuration, traffic load indication.

It should be noted that the information required from repeater 250 to determine whether correct operation is proceeding is minimal. For example AP based metrics may be used to provide information associated with repeater operation. When large networks are deployed, service providers have the ability to include proprietary features into the network devices, including repeaters. Examples of such service providers include the cable MSOs, DSL access providers, and hot spot providers. Deployments associated with these service providers are large enough that vendors are interested in customized WLAN operation. In operating customized WLANs, metrics may be collected at the AP and reported back to the network management center via SNMP from the AP including a variety of information derived from specific types of measurements taken from, for example, repeater transmissions. Simple low data rate, non-standard, overhead communications to and from the repeaters on, for example, a maintenance link will allow full management capability.

Figure 5:
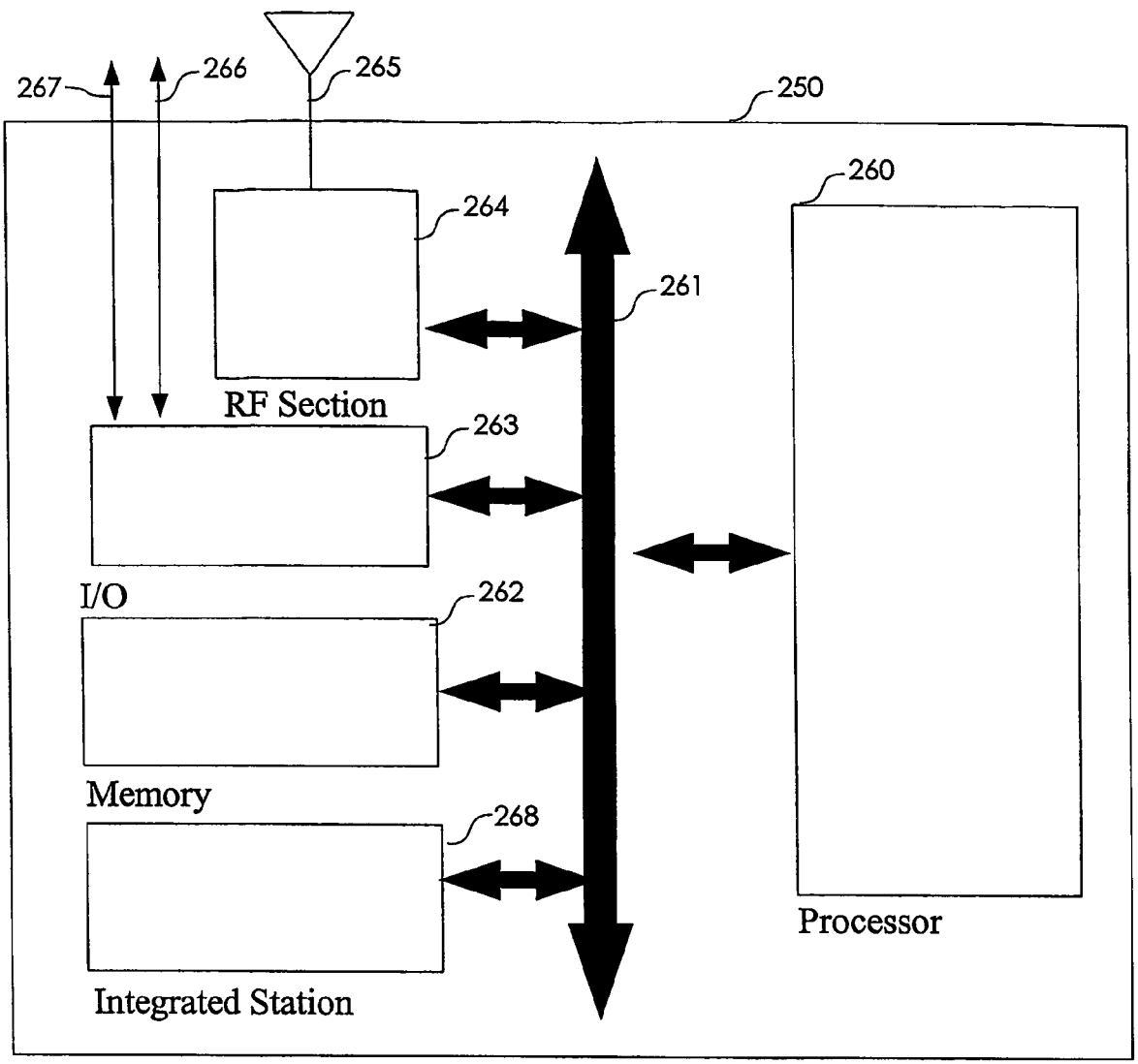
FIG. 5 is a block diagram illustrating components associated with an alternative exemplary repeater having an integrated station.

In accordance with various exemplary and alternative exemplary embodiments, a 802.11 station device (STA) or an appropriate TDD standard device is preferably integrated into the repeater to provide remote network management functions, as well as beacon reception and transmission as previously described, and as illustrated in FIG. 5. It will be appreciated that to reduce costs integrated station 268 is preferably configured with abbreviated capabilities. Accordingly, significant cost savings and performance benefits may be realized over a full AP based repeater. Since only a single lower cost station level device is required, significant portions of the hardware, such as but not limited to for example, processor 260, bus 261, memory 262, I/O section 263, and RF section 264, can be shared between repeater 250 and integrated station 268, keeping costs low. Shared components may further include the receiver, transmitter, synthesizer, and controller hardware which while not specifically shown may be incorporated into the blocks listed above. As beacons and other overhead management functions require a relatively low data rate for communication, only the lowest data rate modulation need be supported by integrated station 268. Since 802.11 compliant packets are supported, integrated station 268 may receive and transmit packets to/from any standards compliant devices requiring no modification to AP MODEMS or Client card MODEMs. Exemplary repeater 250 configured as such still achieves approximately twice the performance of a store and forward AP based repeater since as noted, exemplary repeater 250 is operated in a full-duplex mode, while conventional AP repeaters operate in half-duplex mode, reducing the best case throughput by at least 50%. It should be noted that integrating a station device into the repeater is a fully standards compliant approach, and will not require modification to APs or Station devices at the client.

Figure 6:
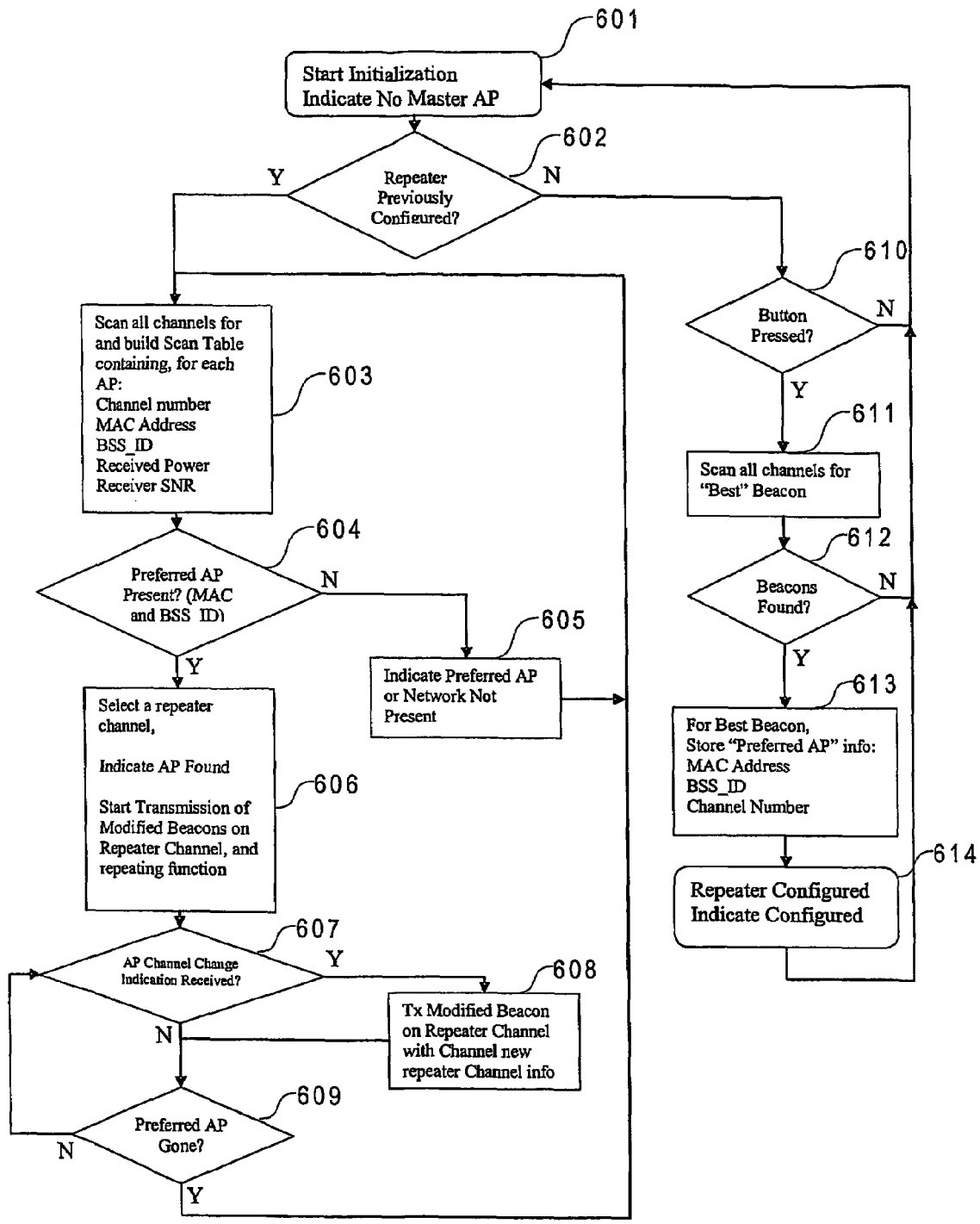
FIG. 6 is a flow chart illustrating various procedures associated with operation of an exemplary repeater.

To better appreciate various procedures in accordance with the present invention, a flow chart is illustrated in FIG. 6. At start 601, which as described above, may be during a power-on sequence, reset sequence, initialization sequence or the like, as precipitated by a power-on event, a button push or the like, may begin the process of determining APs within the range and environment associated with exemplary repeater 250.

As the initialization process begins at 601, AP 210 indicates that the preferred AP has not been found, and that repeater 250 is configuring. Indication may be provided by an indication device such as an LED, LCD, or the like. For instance, a single LED may indicate that repeater 250 is configured and a preferred AP has been found within range. During configuration the indicators may be configured to blink indicating that scanning and configuration is in progress. If repeater 250 has not been previously configured to a preferred AP by way of MAC_Address and BSS_ID, for example at 602, a determination will be made whether a control button has been pressed at 610. Otherwise, since repeater 205 has previously been configured with a preferred AP channels may be scanned and a scanning table built at 603.

If repeater 250 has not been configured, initialization at 601, configuration test at 602 and button test at 610 will be repeated until a button is detected. In accordance with various alternative exemplary embodiments, a button press may force repeater 250 to initialize at 601, for example in the un-configured state. Repeater 250 would proceed to configuration test 602 and, if un-configured, begin scanning for the best channel at 611. It should be appreciated that in accordance with scanning for the best channel at 611, repeater 250 scans all available frequency channels, and if beacons are found, information associated with the channels and the associated AP may be stored at 613. Otherwise repeater 250 may return to initialization at 601. In scanning frequency channels at 613, metrics including one or more of: MAC Address, BSS_ID, received beacon or overhead message power, received beacon or overhead message signal to noise ratio, or beacon interval, and associated with all APs will be compared. It should be noted that the metrics are preferably collected by receiving beacons transmitted from the APs using an embedded station card functionality or beacon modem, for example, as noted above. The best or preferred AP will be selected based on the highest quality for the specific metric chosen. In accordance with various exemplary embodiments, received beacon power is chosen as the preferred metric, and therefore, the AP with the highest received beacon power would be chosen as the preferred AP. Alternatively, repeater 250 may be pre-programmed to only accept APs from specific networks as indicated by, for example, the BSS_ID, thus acting as a filter parameter to be used with a wireless service provider's network deployment.

Once the best or preferred AP is determined key metrics for the preferred AP are stored in, for example, memory 262 which is preferably a non-volatile memory. Repeater 250 once configured with a preferred AP, may be unplugged, moved, and repowered while retaining the configuration information associated with the preferred AP. The configured state is indicated and stored at 614, and repeater 250 returns to the start at 601. If repeater 250 has been previously configured at 602 as it will be if configured with a preferred AP, scanning may proceed at 603 where repeater 250 can scan for metrics associated with the preferred AP. If repeater 250 cannot find a preffered AP it will provide an indication at 605 and return to scanning at 603. If repeater 250 determines that a preferred AP is present at 604, repeating may be initialized at 606. Repeating initialization preferably consists of indicating the preferred AP has been found, determining a second frequency channel to repeat the signals associated with the preferred AP channel to and from, and beginning the beacon spoofing process.

It should be noted that a modem capable of receiving and transmitting beacons and other overhead messages to and from the AP on the preferred AP frequency channel and receiving and transmitting messages on the selected repeated frequency channel is preferably included. For 802.11b and 802.11g networks an exemplary repeater must receive information broadcast from the AP in beacon signals, modify the channel number indication, and transmit the modified beacon signals on the selected repeated channel periodically. The modified beacon signals are preferably transmitted periodically, for example, in accordance with the same time interval as the beacons from the preferred AP. It will further be appreciated that the modem function is only required to support the minimum data rates for beacon functionality, and thus can be simplified in comparison to what would be required in a complete client station card.

It will be appreciated that the above described functionality may be referred to as network management and preferably includes additional overhead messages allowing, for example, for status and control information to be passed between repeater 250 and other 802.11 compliant devices. Further, an exemplary AP would preferably include a SNMP management information base (MIB) and an agent in the AP would periodically query or otherwise collect information about repeater 250 using the network management functionality provided functionality provided via integrated station 268 included in repeater 250. Repeater information would be stored into the MIB in the AP where it may be queried by a higher level network management function, in many cases located in a network operations center.

After repeater 250 has selected a second frequency channel, preferably distinct from the preferred frequency channel, to repeat to and from, indicated the commencement of the repeating operation, and begun transmitting the modified beacon signals on the designated repeated channel, repeater 250 may stand by for a change in channel by the preferred AP. As previously discussed, with dynamic frequency selection as specified in 802.11h, the preferred AP may transmit an indication that the current operating frequency is about to change. Since repeater 250, monitors the beacon transmissions from the preferred AP, repeater 250 will receive the channel change indication which is broadcast for a period of time prior to the channel change. When a test for receipt of the channel change indication at 607 shows a change is impending, the repeater channel in transmitted beacon signals will be changed at 608 if such a change of the repeated channel is required. If no repeated channel is required, only the AP frequency channel may change having little effect on the operation of the stations on the repeated frequency channel since repeater 250 will track the preferred frequency channel as it changes. If no change is impending, repeater 250 checks to see if the preferred AP beacons are present at 609. If the beacons are not present, repeater 250 returns to scanning at 603, otherwise repeater 250 continues to monitor for a channel change at 607.

It should be noted that at least two and potentially more frequency channels are preferably monitored to determine the presence of one or more APs. Information associated with the monitored channels may include beacon signals or the like which may be monitored according to a metric such as a power level, SNR, MAC Address, and BSS_ID or the like.

It is interesting to note that a network using an exemplary repeater will be significantly more efficient, despite using two channels, than a network without a repeater, since the exemplary repeater not only increases the range, often up to a factor of 2, at which WI-FI stations can connect, but also increases the data rate for units with a poor connection. With such a performance increase, stations will spend less time occupying frequency channels in the network allowing access opportunities for other users and increasing overall network performance.

As an example, consider an exemplary WLAN operating under the following conditions. Two stations, station1 and station2 are in range of an 802.11a AP. Station1 is close to the AP and receives the full 54 MBPS physical layer data rate or 24 MBPS effective TCP/IP throughput. Station 2 is near the edge of the coverage area of the AP and receives only the minimum 6 MBPS physical layer data rate which is also the approximate TCP/IP throughput. By incorporating an exemplary repeater into the WLAN environment, station2 now receives data at 18 MBPS. With the same traffic load on each station, the network throughput may be computed as follows. Without a repeater, station2 will spend 24/6=4 times the amount of time using the AP as station 1. The resulting network capacity, neglecting contention, is (24+4*6)/5=9.6 MBPS. With an exemplary repeater incorporated, station2 now spends 24/18=1.33 times the amount of time using the AP as station1 resulting in a network capacity, neglecting contention, of (24+1.33*18)/2.33=20.5 MBPS. As is evident, greater than twice the network throughput is achieved, compensating for the increase in frequency channel use. It should be noted that if two APs are used in the same location, the average network capacity would be (24+6)/2=15 MBPS, however the station2 continues to be served at only 6 MBPS. Since there is more area at the edge of the coverage area the benefit will increase when more users are present.

It should be noted that in accordance with various exemplary embodiments, security concerns are being addressed in WLANs by groups such as the 802.11i enhanced security mechanism group. Present security measures are typically encryption based and meant to fix security problems within, for example, the Wireless Encryption Protocol (WEP) and Wi-Fi Protected Access (WPA). It should be noted that security protocols are transparent to an exemplary repeater in accordance with the present invention. Since encrypted data is passed through repeater 250 without decryption, the exemplary repeater is inherently more secure than other possible repeater architectures which decrypt data before retransmitting.

It will further be appreciated that changes and alterations to specific components, and the interconnections thereof, can be made by one of ordinary skill in the art without deviating from the scope and spirit of the present invention.

What is claimed is:

1. A method for operating a repeater in a wireless network including at least one access point, the method comprising:
   detecting the presence of at least one access point based on information transmitted on one of at least two frequency channels using a wireless transmission protocol associated with the at least one access point;
   identifying the detected at least one access point based upon the detected information;
   selecting the identified at least one access point and the at least two frequency channels for repeater operation;
   retransmitting, from the repeater, information that is received at the repeater;
   wherein the repeater is configured to perform the retransmitting step by retransmitting first information received from the selected at least one access point on one of the at least two frequency channels to a node in the wireless network, and/or by retransmitting second information from the node to the selected at least one access point on another of the at least two frequency channels, and wherein the repeater is further configured to perform the retransmitting step by retransmitting a beginning portion of the first information and/or the second information prior to receiving an end portion of the first information and/or the second information.

2. A method according to claim 1, wherein the detecting is initiated automatically during a power-on sequence associated with the repeater.

3. A method according to claim 1, wherein the detecting is initiated by activating an input device associated with the repeater.

4. A method according to claim 3, wherein the input device includes a button.

5. A method according to claim 1, wherein the wireless network includes a time division duplex wireless local area network compliant with at least one of an IEEE 802.11 specification, and an IEEE 802.16 specification.

6. A method according to claim 1, wherein the detecting includes: scanning the at least two frequency channels for a beacon signal thereon associated with the at least one of the at least two frequency channels; and choosing the at least one access point as a preferred access point based on a quality of a metric associated with the beacon signal.

7. A method according to claim 6, wherein the metric includes one or more of: a power level associated with the beacon signal, a media access control (MAC) address contained in the beacon signal, a basic service set identifier (BSS_ID) contained in the beacon signal, and a signal to noise ratio associated with the beacon signal.

8. A method according to claim 1, further comprising scanning the at least two frequency channels at a periodic interval to determine if the selected at least one access point has changed to another of the at least two frequency channels.

9. A method according to claim 1, wherein the detecting includes: scanning the at least two frequency channels; and storing the information associated with each of the at least two frequency channels in a memory associated with the repeater.

10. A method according to claim 9, wherein the detecting further includes: re-scanning the at least two frequency channels; and using the stored information associated with each of the at least two frequency channels to re-select another of the at least one access point.

11. A method according to claim 10, wherein the re-scanning is performed upon power-up of the repeater.

12. A method according to claim 9, wherein the storing includes: storing the information in a non-volatile memory; moving the repeater to a new location and re-powering the repeater; and using the stored information when the repeater is re-powered in the new location, to acquire the one of the at least two frequency channels by scanning the at least two frequency channels and comparing information obtained during the scanning with the information stored in the non-volatile memory.

13. A method according to claim 9, wherein the storing includes: storing the information in a non-volatile memory; moving the repeater to a new location and re-powering the repeater; and using the stored information when the repeater is re-powered in the new location to acquire another of the at least two frequency channels and an address associated with the at least one access point.

14. A method according to claim 1, wherein the information associated with the at least two frequency channels is used to eliminate another of the at least two frequency channels as being available.

15. A method according to claim 1, wherein the information includes system level information transmitted from the at least one access point.

16. A method according to claim 15, wherein the system level information includes a media access control (MAC) address associated with the at least one access point.

17. A method according to claim 15, wherein the system level information includes a basic service set identifier (BSS_ID) associated with the at least one access point.

18. A method according to claim 15, further comprising transmitting the system level information on a maintenance link associated with the at least one access point.

19. A method according to claim 1, wherein the detecting includes: scanning the at least two frequency channels to detect one of: a media access control (MAC) address, and a basic service set identifier (BSS_ID) associated with the at least one access point.

20. A method according to claim 1, further comprising notifying one or more clients on a repeated channel that the one of the at least two frequency channels associated with the at least one access point has changed.

21. A method according to claim 1, further comprising: establishing a maintenance link between an integrated station device associated with the repeater and the at least one access point; and receiving a remote management message including the information in the integrated station device over the established maintenance link.

22. A method according to claim 21, further comprising: storing the information in a memory; and generating a scan table in the memory based on the stored information.

23. A method according to claim 21, further comprising: storing the information obtained using the maintenance link in the at least one access point, and monitoring the information using one of: a SNMP, and a network management protocol.

24. A method according to claim 1, further comprising: integrating at least a partial station device capability into the repeater for receiving beacon signals from the at least one access point; and transmitting the beacon signals on another of the al least two frequency channels associated with the repeater.

25. A method according to claim 24, further comprising: modifying the information received in the beacon signals to provide new frequency channel information to form a modified beacon signal; and transmitting the modified beacon signal on the another of the at least two frequency channels.

26. A method according to claim 24, further comprising:
modifying the information received in the beacon signals by deleting at least a portion of a (direct sequence) DS_parameters message compliant with an 802.11 standard protocol associated with the beacon signal to form a modified beacon signal; and transmitting the modified beacon signal on the another of the at least two frequency channels.

27. A repeater for use in a wireless network having at least one access point, the repeater comprising:
a radio frequency section;
a memory storing instructions; and
a processor coupled to the radio frequency section and the memory, the instructions capable of being executed by the processor, the instructions for causing the processor to:
detect the presence of at least one access point based on information transmitted on one of at least two frequency channels using a wireless transmission protocol associated with the at least one access point;
identify the detected at least one access point based upon the detected information; and
select the identified at least one access point and the at least two frequency channels for repeater operation;
wherein the repeater is configured to retransmit first information received from the selected at least one access point on one of the at least two frequency channels to a node in the wireless network, wherein the repeater is configured to retransmit second information from the node to the selected at least one access point on another of the at least two frequency channels, and wherein the repeater is configured to retransmit a beginning portion of the first information and the second information prior to receiving an end portion of the first information and the second information.

28. A repeater according to claim 27, wherein the instructions, in causing the processor to detect, further cause the processor to initiate detecting automatically during a power-on sequence.

29. A repeater according to claim 27, further comprising an input device, and wherein the instructions, in causing the processor to detect, further cause the processor to initiate detection by determining that the input device has been activated.

30. A repeater according to claim 29, wherein the input device includes a button.

31. A repeater according to claim 27, wherein the wireless network includes a time division duplex wireless local area network compliant with at least one of an IEEE 802.11 specification, an IEEE 802.16 specification, and an IEEE 802.20 specification.

32. A repeater according to claim 27, wherein the instructions, in causing the processor to detect, further cause the processor to: scan the at least two frequency channels for a broadcast signal including a beacon signal thereon associated with the at least one of the at least two frequency channels; and choose the at least one access point as a preferred access point based on a quality of a metric associated with the broadcast signal including the beacon signal.

33. A repeater according to claim 32, wherein the metric includes a power level associated with the beacon signal.

34. A repeater according to claim 27, wherein the instructions further cause the processor to scan the at least two frequency channels to determine if the selected at least one access point has changed to another of the at least two frequency channels if a transmission from the preferred access point has not been received by a predetermined time.

35. A repeater according to claim 27, wherein the instructions, in causing the processor to detect, further cause the processor to: scan the at least two frequency channels; and store the information associated with each of the at least two frequency channels in the memory.

36. A repeater according to claim 35, wherein the instructions, in causing the processor to detect, further cause the processor to: re-scan the at least two frequency channels; and use the stored information associated with each of the at least two frequency channels to re-select another of the at least one access points.

37. A repeater according to claim 36, wherein the instructions, in causing the processor to re-scan, further cause the processor to re-scan upon power-up of the repeater.

38. A repeater according to claim 35, wherein the memory includes a non-volatile memory, and wherein the instructions in causing the processor to store, further cause the processor to: store the information in the non-volatile memory; and use the stored information when the repeater is re-powered in a new location, to acquire one of the at least one access point on the one of the at least two frequency channels using an address associated with the acquired one of the at least one access point.

39. A repeater according to claim 27, wherein the information associated with the at least two frequency channels is used to eliminate another of the at least two frequency channels as being available.

40. A repeater according to claim 27, wherein the information includes system level information transmitted from the at least one access point.

41. A repeater according to claim 40, wherein the system level information includes a media access control (MAC) address associated with the at least one access point.

42. A repeater according to claim 40, wherein the system level information includes a basic service set identifier (BSS_ID) associated with at least one access point.

43. A repeater according to claim 40, wherein the instructions further cause the processor to transmit the system level information on a maintenance link associated with the at least one access point.

44. A repeater according to claim 27, wherein the instructions in causing the processor to detect, further cause the processor to:
scan the at least two frequency channels to detect one of: a media access control (MAC) address, and a basic service set identifier (BSS_ID) associated with the at least one access point.

45. A repeater according to claim 27, wherein the instructions further cause the processor to notify one or more clients on a repeated one of the at least two frequency channels that the repeated one of the at least two frequency channels is going to change.

46. A repeater according to claim 27, further comprising an integrated station coupled to the radio frequency section, the memory, and the processor, and wherein the instruction further cause the processor to: establish a maintenance link between the integrated station device and the at least one access points; and receive a remote management message including the information, in the integrated station device over the established maintenance link.

47. A repeater according to claim 46, wherein the instructions further cause the processor to: store the information in the memory; and generate a scan table in the memory based on the stored information.

48. A repeater according to claim 27, further comprising an integrated station device coupled to the radio frequency section, the memory, and the processor, and wherein the instructions further cause the processor to: receive a beacon signal from the at least one access point; and modify at least a portion of the beacon signal associated with an assigned frequency channel to indicate a modified assigned frequency channel, the modified assigned frequency channel including the one of the at least two frequency channels to form a modified beacon signal; and transmit the modified beacon signal on the another of the at least two frequency channels.

49. A method for operating a time division duplex repeater in a wireless network operating in accordance with a wireless protocol, the wireless network including at least two frequency channels including a repeater frequency channel, the wireless network including at least one access point and a station device, the method comprising:
receiving a packet at the time division duplex repeater;
sending an acknowledgment message to the at least one access point in response to a successful reception of the packet in accordance with the wireless protocol; and
retransmitting a beginning portion of the packet prior to receiving an end portion of the packet,
wherein the packet is received on the repeater frequency channel at the station device, wherein the repeater does not generate the acknowledgement message when the packet is intended for the station device on the repeater frequency channel.

50. A repeater in a wireless network including at least one access point, the repeater comprising:
means for detecting the presence of at least one access point based on information transmitted on one of at least two frequency channels using a wireless transmission protocol associated with the at least one access point;
means for identifying the detected at least one access point based upon the detected information; and
means for selecting the identified at least one access point and the at least two frequency channels for repeater operation;
wherein the repeater is configured to retransmit first information received from the selected at least one access point on one of the at least two frequency channels to a node in the wireless network, wherein the repeater is configured to retransmit second information from the node to the selected at least one access point on another of the at least two frequency channels, and wherein the repeater is configured to retransmit a beginning portion of the first information and the second information prior to receiving an end portion of the first information and the second information.

* * * * *